United States Patent
Sohn et al.

(10) Patent No.: US 9,504,067 B2
(45) Date of Patent: Nov. 22, 2016

(54) METHOD FOR REPORTING CHANNEL STATE INFORMATION IN WIRELESS COMMUNICATION SYSTEM, AND APPARATUS THEREFOR

(71) Applicant: LG ELECTRONICS INC., Seoul (KR)

(72) Inventors: Illsoo Sohn, Anyang-si (KR); Kijun Kim, Anyang-si (KR); Jonghyun Park, Anyang-si (KR); Hyungtae Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 14/376,971

(22) PCT Filed: Mar. 7, 2013

(86) PCT No.: PCT/KR2013/001873
§ 371 (c)(1),
(2) Date: Aug. 6, 2014

(87) PCT Pub. No.: WO2013/133653
PCT Pub. Date: Sep. 12, 2013

(65) Prior Publication Data
US 2015/0009928 A1    Jan. 8, 2015

Related U.S. Application Data

(60) Provisional application No. 61/608,101, filed on Mar. 7, 2012, provisional application No. 61/623,567, filed on Apr. 13, 2012.

(51) Int. Cl.
*H04W 24/10* (2009.01)
*H04W 74/08* (2009.01)
(Continued)

(52) U.S. Cl.
CPC ......... *H04W 74/0875* (2013.01); *H04B 7/024* (2013.01); *H04B 7/0647* (2013.01);
(Continued)

(58) Field of Classification Search
CPC ... H04B 7/0632; H04L 1/0693; H04W 24/10
See application file for complete search history.

(56) References Cited

FOREIGN PATENT DOCUMENTS

| JP | 2013-539278 | 10/2013 |
|---|---|---|
| KR | 10-2009-0082427 | 7/2009 |

(Continued)

OTHER PUBLICATIONS

R1-110371, "Periodic CSI Transmission on PUCCH for carrier aggregation", Jan. 17-21, 2011, pp. 1-3.*

(Continued)

*Primary Examiner* — Andrew Chriss
*Assistant Examiner* — Salvador E Rivas
(74) *Attorney, Agent, or Firm* — Lee Hong Degerman Kang & Waimey

(57) ABSTRACT

The present invention relates to a wireless communication system. More particularly, the present invention relates to a method and apparatus for a terminal to report channel state information in a wireless communication system, the method comprising: a step of transmitting first channel state information according to a first channel state information (CSI) process for reporting the first channel state information periodically for every first period; a step of transmitting second channel state information according to a second CSI process for reporting the second channel state information periodically for every second period; and a step of dropping the transmission of either the first channel state information or the second channel state information on the basis of the CSI process index of each of the first and second CSI processes in the event the first channel state information transmission timing and the second channel state information transmission timing conflict.

10 Claims, 23 Drawing Sheets

(51) Int. Cl.
*H04L 1/06* (2006.01)
*H04L 1/00* (2006.01)
*H04B 7/02* (2006.01)
*H04B 7/06* (2006.01)

(52) U.S. Cl.
CPC ............ *H04L1/0026* (2013.01); *H04L 1/0027* (2013.01); *H04L 1/0693* (2013.01); *H04W 24/10* (2013.01); *H04B 7/063* (2013.01); *H04B 7/0632* (2013.01); *H04B 7/0639* (2013.01)

(56) References Cited

FOREIGN PATENT DOCUMENTS

| KR | 10-2010-0002114 | 1/2010 |
|---|---|---|
| KR | 10-2012-0011794 | 2/2012 |
| WO | 2010/144875 | 12/2010 |
| WO | 2012/023007 | 2/2012 |
| WO | 2012/024181 | 2/2012 |

OTHER PUBLICATIONS

R1-112283, "Aperiodic CSI feedback triggering for joint transmission CoMP", Aug. 22-26, 2011, pp. 1-3.*
R1-111324, "Priority setting for periodic CQI/PMI/RI reporting in CA", Feb. 21-25, 2011, pp. 1-2.*
LTE, "Evolved Universal Terrestrial Radio Access (E-UTRA); Physical layer procedures (3GPP TS 36.213 version 10.4.0 Release 10)," Jan. 2012, 128 pages (relevant portions: section 7.2.2).
PCT International Application No. PCT/KR2013/001873, Written Opinion of the International Searching Authority dated Jun. 21, 2013, 1 pages.
PCT International Application No. PCT/KR2013/001873, Written Opinion of the International Searching Authority dated Jun. 21, 2013, 17 pages.
Huawei, et al., "Periodic CSI feedback collision handling for CoMP," 3GPP TSG RAN WG1 Meeting #70, R1-123104, Aug. 2012, 7 pages.
Intel Corp, "Remaining details of periodic CSI reporting," 3GPP TSG-RAN WG1 #71, R1-124723, Nov. 2012, 3 pages.
ZTE, "Periodic CSI feedback modes for CoMP," 3GPP TSG RAN WG1 Meeting #70bis, R1-124197, Oct. 2012, 6 pages.
Texas Instruments, "CSI Feedback to support downlink CoMP," 3GPP TSG RAN WG1 Meeting #68, R1-120463, Feb. 2012, 3 pages.
Pantech, "Aperiodic CSI feedback trigging for joint transmissions CoMP," 3GPP TSG RAN1 #66, R1-112283, Aug. 2011, 3 pages.
HT mMobile Inc., "Priority setting for periodic CQI/PMI/RI reporting in CA," 3GPP TSG-RAN WG2 Meeting #73, R2-111324, Feb. 2011, 2 pages.
Texas Instruments, "On Periodic CSI reporting for Carrier Aggregation," 3GPP TSG RAN WG1 #63bis, R1-110257, Jan. 2010, 4 pages.
LG Electronics, "Periodic CSI transmission on PUCCH for carrier aggregation," 3GPP TSG RAN WG1 #63bis, R1-110371, Jan. 2011, 3 pages.
European Patent Office Application Serial No. 13758706.9, Search Report dated Sep. 9, 2015, 10 pages.
Hitachi Ltd., "Discussion on RRM/CoMP Measurement Set Management," 3GPP TSG-RAN WG1 #68, R1-120244, Feb. 2012, 4 pages.
Fujitsu, "Email Discussion [69-10]: Details of Collision Handling and Compression/Multiplexing in Case of 2 or More CSIs Being Configured in the Same Reporting Instance for CoMP CSI Feedback," 3GPP TSG RAN WG1 #69, R1-122930, May 2012, 30 pages.

* cited by examiner (Prior Art)

FIG. 2
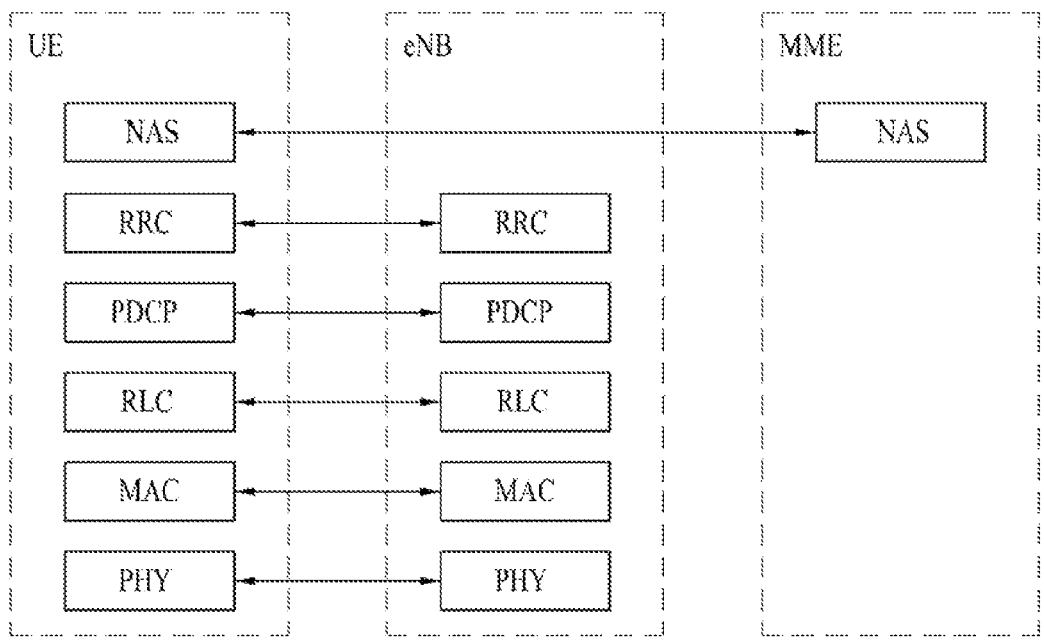
(a) CONTROL-PLANE PROTOCOL STACK
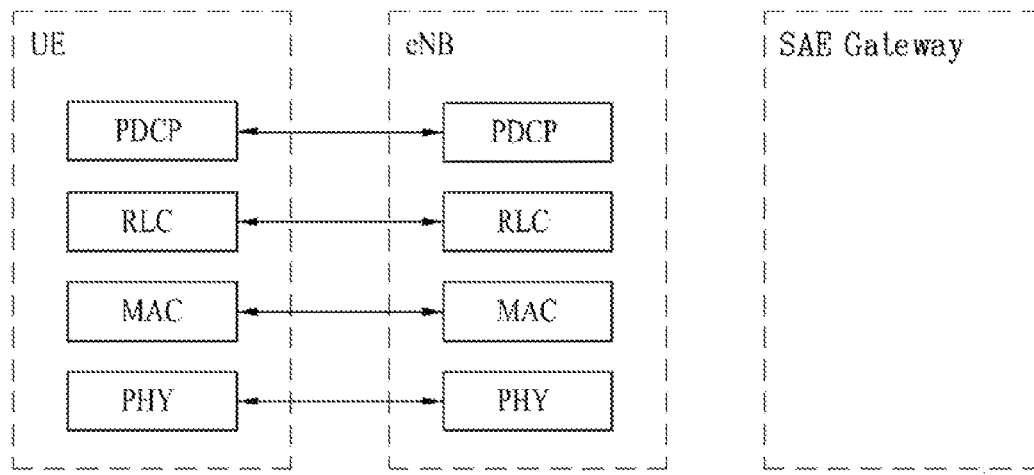
(b) USER-PLANE PROTOCOL STACK

FIG. 8

| CQI REPORTING MODE | | PMI FEEDBACK TYPE | |
|---|---|---|---|
| | | NO PMI | SINGLE PMI |
| PUCCH CQI FEEDBACK TYPE | WIDEBAND (WIDEBAND CQI) | MODE 1-0 | MODE 1-1 |
| | UE-SELECTED (SUBBAND CQI) | MODE 2-0 | MODE 2-1 |

FIG. 14
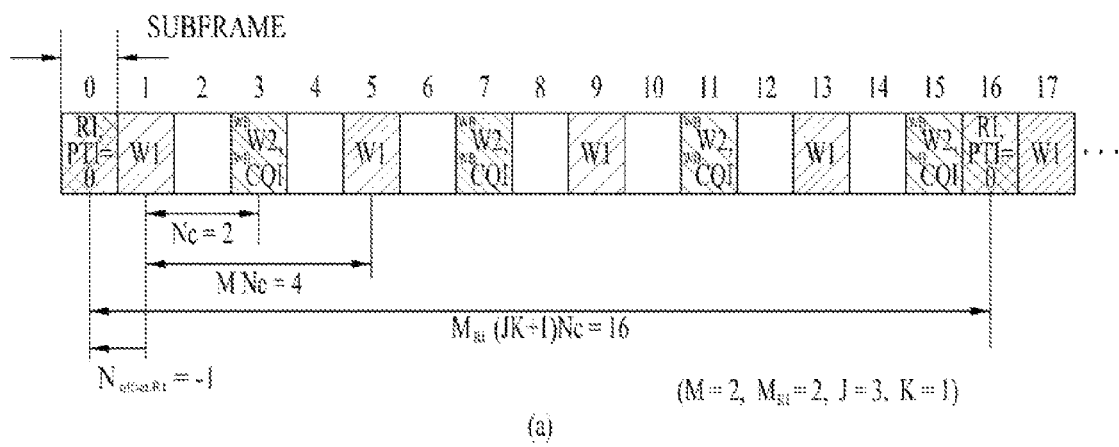
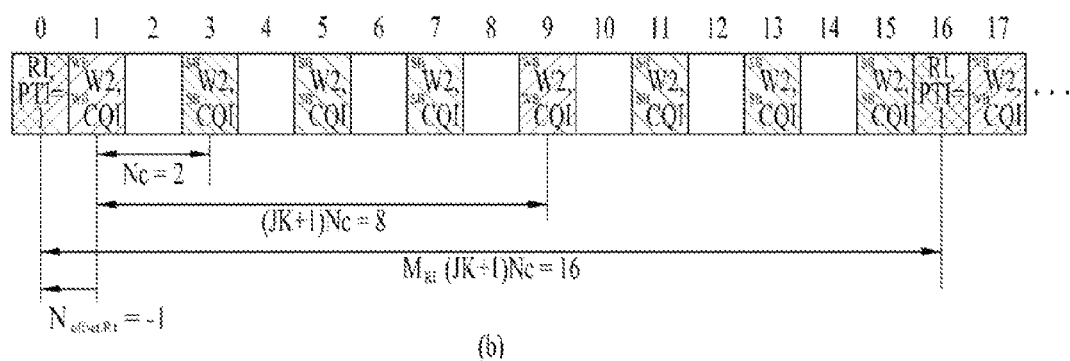
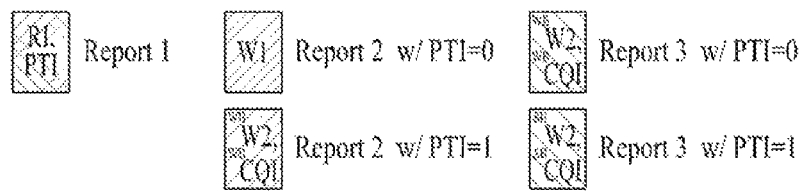

FIG. 22

| Feedback configuration | Feedback contents | Desired signal hypothesis | | Interfer signal hypothesis | |
|---|---|---|---|---|---|
| | | TP1 | TP2 | TP1 | TP2 |
| CSI process 1 | $RI_1/PMI_1/CQI_1$ | On | Off | Off | On |
| CSI process 2 | $RI_2/PMI_2/CQI_2$ | On | Off | Off | Off |
| CSI process 3 | $RI_3/PMI_3/CQI_3$ | Off | On | On | Off |
| CSI process 4 | $RI_4/PMI_4/CQI_4$ | Off | On | Off | Off |
| CSI process 5 | $RI_5/PMI_5$(for TP1) $/PMI_6$(for TP2)$/CQI_5$ | On | On | Off | Off |

FIG. 23

| Category (meaning) | CSI feedback configurations | Priority value |
|---|---|---|
| Class A (high priority) | CSI process 1, 2 | 3 |
| Class B (middle priority) | CSI process 3, 4 | 2 |
| Class C (low priority) | CSI process 5 | 1 |

FIG. 24

| Category (meaning) | Information type | Priority value |
|---|---|---|
| Class A (high priority) | RI | 3 |
| Class B (middle priority) | Wideband PMI, Wideband CQI | 2 |
| Class C (low priority) | Subband PMI, Subband CQI | 1 |

METHOD FOR REPORTING CHANNEL STATE INFORMATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2013/001873, filed on Mar. 7, 2013, which claims the benefit of U.S. Provisional Application Ser. No. 61/608,101, filed on Mar. 7, 2012, and 61/623,567, filed on Apr. 13, 2012, the contents of which are all hereby incorporated by reference herein in their entirety.

TECHNICAL FIELD

The present invention relates to a wireless communication system, and more particularly, to a method and apparatus for reporting channel state information (CSI) in a wireless communication system.

BACKGROUND ART

A $3^{rd}$ generation partnership project long term evolution (3GPP LTE) communication system will be described as an exemplary wireless communication system to which the present invention can be applied.

FIG. 1 is a schematic view illustrating an evolved universal mobile telecommunications system (E-UMTS) network configuration as an exemplary wireless communication system. E-UMTS is an evolution of the legacy UMTS. E-UMTS is under basic standardization in the 3GPP. In general, it can be said that E-UMTS is an LTE system. For details of the UMTS and E-UMTS technical specifications, refer to Release 7 and Release 8 in "$3^{rd}$ generation partnership project; technical specification group radio access network".

Referring to FIG. 1, the E-UMTS system includes a User Equipment (UE), evolved Node Bs (eNode Bs or eNBs), and an Access Gateway (AG) which is located at an end of the network (E-UTRAN), connected to an external network. An eNode B can simultaneously transmit multiple data streams for broadcast service, multicast service and/or unicast service.

A single eNode B manages one or more cells. A cell is set to operate in one of the bandwidths of 1.25, 2.5, 5, 10, 15 and 20 Mhz and provides downlink or uplink transmission service to a plurality of UEs. Different cells may be set to provide different bandwidths. The eNode B controls data transmission and reception to and from a plurality of UEs. Regarding downlink (DL) data, the eNode B signals information about a time/frequency area, coding scheme, data size, hybrid automatic repeat and request (HARQ) information, etc. for data transmission to a UE by DL scheduling information. Regarding uplink (UL) data, the eNode B signals information about a time/frequency area, coding scheme, data size, hybrid automatic repeat and request (HARQ) information, etc. available to the UE by UL scheduling information. An interface for transmitting user traffic or control traffic may be used between eNode Bs. A core network (CN) may be configured with an AG and a network node for performing user registration of a UE. The AG manages the mobility of UEs on a Tracking Area (TA) basis. A TA is composed of a plurality of cells.

Although wireless communication technology has reached the developmental stage of LTE based on wideband code division multiple access (WCDMA), demands and expectations of users and service providers are ever increasing. Considering that other radio access technologies are being developed, new technological evolutions are required to achieve future competitiveness. There exists a need for reduction of cost per bit, increase of service availability, flexible use of frequency bands, simplified structures and open interfaces, and appropriate power consumption of UEs.

A UE periodically and/or aperiodically reports channel state information (CSI) of a current channel for aid in effective management of a wireless communication system of an eNode B. The reported CSI can include results obtained via calculation in consideration of various situations and thus there is a need for a more effective reporting method.

DISCLOSURE

Technical Problem

An object of the present invention devised to solve the problem lies in a method and apparatus for reporting channel state information (CSI) in a wireless communication system.

Technical Solution

The object of the present invention can be achieved by providing a method for reporting channel state information (CSI) in a wireless communication system, the method including transmitting first CSI according to a first CSI process of periodically reporting the first CSI every first period, transmitting second CSI according to a second CSI process of periodically reporting the second CSI every second period, and dropping transmission of one of the first and second CSI based on a CSI process index of each of the first and second CSI processes when transmission timing of the first CSI and transmission timing of the second CSI collide.

The dropping may include dropping transmission of remaining CSI except for information corresponding to a CSI process with a lowest CSI process index from the first and second CSI The dropping may include comparing first priority of the first CSI and second priority of the second CSI when the transmission timing of the first CSI and the transmission timing of the second CSI collide, and dropping transmission of one of the first and second CSI based on a CSI process index of each of the first and second processes when the first and second priorities are the same.

In another aspect of the present invention, provided herein is a user equipment (UE) for reporting CSI in a wireless communication system, the UE including a wireless communication module configured to transmit and receive a signal to and from base stations (BSs), and a processor connected to the wireless communication module and configured to control an operation of the UE, wherein the processor is configured to transmit first CSI according to a first CSI process of periodically reporting the first CSI every first period, to transmit second CSI according to a second CSI process of periodically reporting the second CSI every second period, and drops transmission of one of the first and second CSI based on a CSI process index of each of the first and second CSI processes when transmission timing of the first CSI and transmission timing of the second CSI collide.

The first and second CSI may be CSI for the same serving cell.

The first and second CSI may include at least one of a channel quality indicator (CQI), a precoding matrix indicator (PMI), and a rank indicator (RI).

The first and second CSI may be transmitted through a physical downlink control channel (PDCCH).

Advantageous Effects

According to embodiments of the present invention, channel state information (CSI) may be effectively reported in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 2 illustrates a control-plane protocol stack and a user-plane protocol stack in a radio interface protocol architecture between a user equipment (UE) and an evolved UMTS terrestrial radio access network (E-UTRAN), conforming to a $3^{rd}$ generation partnership project (3GPP) wireless access network standard;

FIGS. 8 to 11 illustrate periodic channel state information (CSI) reporting in LTE;

FIG. 14 illustrates a process of periodically reporting CSI for use of hierarchical codebook;

FIG. 22 is a table showing various types of channel information (feedback contents) that a UE reports in a CoMP transmission situation in which two cells (TP1 and TP2) transmits data in cooperation with each other according to an embodiment of the present invention;

FIG. 23 illustrates an example in which different priorities are configured for CSI processes and priority values are configured, according to an embodiment of the present invention;

FIG. 24 is a diagram illustrating an example in which priority and a priority value are set according to a type of channel information transmitted via a CSI process according to an embodiment of the present invention.

BEST MODE

Figure 1:
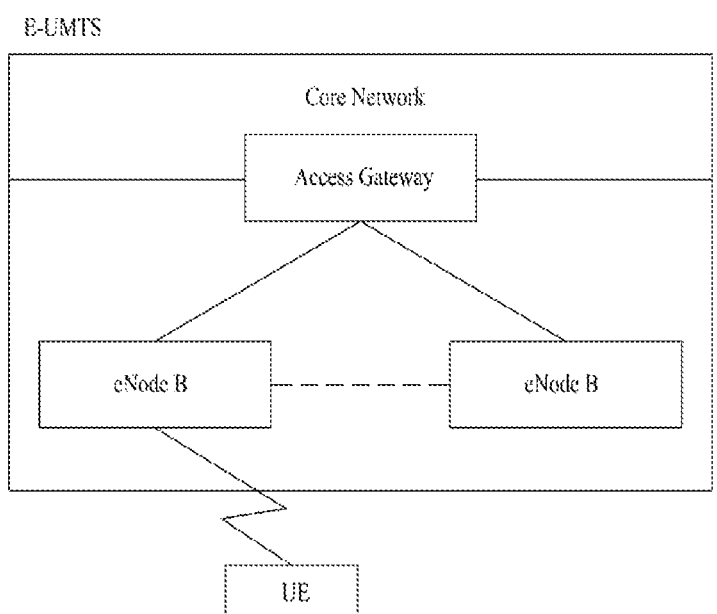
FIG. 1 is a schematic view illustrating an evolved universal mobile telecommunications system (E-UMTS) network configuration as an exemplary wireless communication system.

The configuration, operation, and other features of the present invention will readily be understood with embodiments of the present invention described with reference to the attached drawings. Embodiments of the present invention as set forth herein are examples in which the technical features of the present invention are applied to a $3^{rd}$ generation partnership project (3GPP) system.

While embodiments of the present invention are described in the context of long term evolution (LTE) and LTE-advanced (LTE-A) systems, this is purely exemplary. Thus, the embodiments of the present invention are applicable to any communication system falling within the definition. In addition, while the embodiments of the present invention are described in the context of Frequency Division Duplex (FDD) by way of example, the present invention can also be readily implemented in Half-FDD (H-FDD) or Time Division Duplex (TDD) with some modifications.

FIG. 2 illustrates a control-plane protocol stack and a user-plane protocol stack in a radio interface protocol architecture between a User Equipment (UE) and an Evolved UMTS Terrestrial Radio Access Network (E-UTRAN), conforming to a 3GPP wireless access network standard. The control plane is a path in which the UE and the E-UTRAN transmit control messages to manage calls, and the user plane is a path in which data generated from an application layer, for example, voice data or Internet packet data is transmitted.

A physical layer at Layer 1 (L1) provides information transfer service to its higher layer, Medium Access Control (MAC) layer. The physical layer is connected to the MAC layer via transport channels. The transport channels deliver data between the MAC layer and the physical layer. Data is transmitted on physical channels between the physical layers of a transmitter and a receiver. The physical channels use time and frequency as radio resources. Specifically, the physical channels are modulated in orthogonal frequency division multiple access (OFDMA) for downlink and in single carrier frequency division multiple access (SC-FDMA) for uplink.

The MAC layer at Layer 2 (L2) provides service to its higher layer, radio link control (RLC) layer via logical channels. The RLC layer at L2 supports reliable data transmission. The functionality of the RLC layer may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A radio resource control (RRC) layer at the lowest part of Layer 3 (or L3) is defined only on the control plane. The RRC layer controls logical channels, transport channels, and physical channels in relation to configuration, reconfiguration, and release of radio bearers (RBs). An RB refers to a service provided at L2, for data transmission between the UE and the E-UTRAN. For this purpose, the RRC layers of the UE and the E-UTRAN exchange RRC messages with each other. If an RRC connection has been established between the RRC layers of the UE and the E-UTRAN, the UE is in RRC connected mode. Otherwise, the UE is in RRC idle mode. A non-access stratum (NAS) layer above the RRC layer performs functions such as session management, mobility management, etc.

A cell covered by an evolved Node B (eNode B or eNB) is set to one of the bandwidths of 1.25, 2.5, 5, 10, 15, and 20 MHz and provides downlink or uplink transmission service to a plurality of UEs in the bandwidth. Different cells may be set to different bandwidths.

Downlink transport channels used to deliver data from the E-UTRAN to UEs include a broadcast channel (BCH) carrying system information, a paging channel (PCH) carrying a paging message, and a downlink shared channel (SCH) carrying user traffic or a control message. Downlink multicast or broadcast traffic or control messages may be transmitted on the downlink SCH or a separately defined downlink multicast channel (MCH). Uplink transport channels used to deliver data from a UE to the E-UTRAN include a random access channel (RACH) carrying an initial control message and an uplink SCH carrying user traffic or a control message. Logical channels that are defined above transport channels and mapped to the transport channels include a broadcast control channel (BCCH), a paging control channel (PCCH), a common control channel (CCCH), a multicast control channel (MCCH), and a multicast traffic channel (MTCH).

Figure 3:
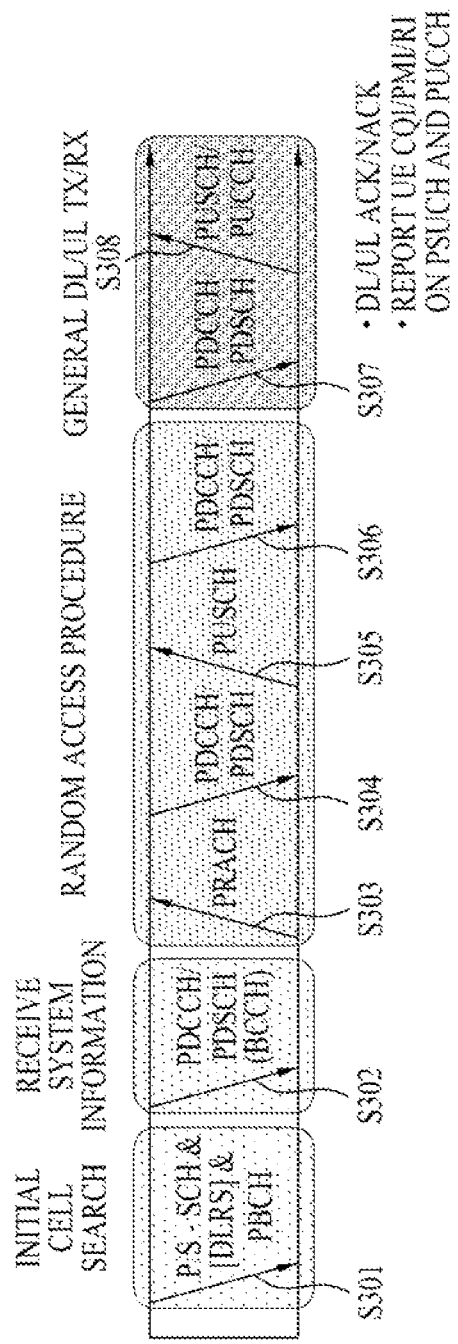
FIG. 3 illustrates physical channels and a general method for transmitting signals on the physical channels in a 3GPP system.

FIG. 3 illustrates physical channels and a general method for transmitting signals on the physical channels in a 3GPP system.

When a UE is powered on or enters a new cell, the UE performs initial cell search (S301). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a downlink channel state by receiving a downlink reference signal (DL RS).

After the initial cell search, the UE may acquire detailed system information by receiving a physical downlink control channel (PDCCH) and receiving a physical downlink shared channel (PDSCH) based on information delivered on the PDCCH (S302).

If the UE initially accesses the eNB or has no radio resources for signal transmission to the eNB, the UE may perform a random access procedure (S303 to S306). In the random access procedure, the UE may transmit a predetermined sequence as a preamble on a physical random access channel (PRACH) (S303 and S305) and may receive a response message to the preamble on a PDCCH and a PDSCH associated with the PDCCH (S304 and S306). In the case of a contention-based random access procedure, the UE may additionally perform a contention resolution procedure.

After the above procedure, the UE may receive a PDCCH and/or a PDSCH from the eNB (S307) and transmit a physical uplink shared channel (PUSCH) and/or a physical uplink control channel (PUCCH) to the eNB (S308), which is a general downlink and uplink signal transmission procedure. Particularly, the UE receives downlink control information (DCI) on the PDCCH. The DCI includes control information such as resource allocation information for the UE. The DCI has a different format depending on its usage.

Control information that the UE transmits to the eNB on the uplink or receives from the eNB on the downlink includes a downlink/uplink acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 4:
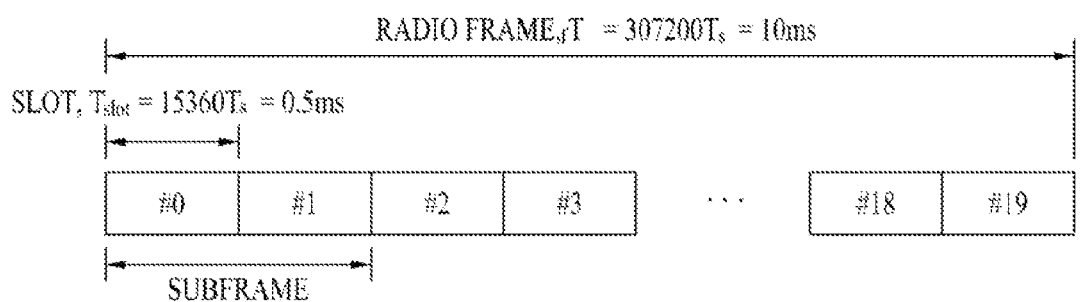
FIG. 4 illustrates an exemplary radio frame structure in a long term evolution (LTE) system.

FIG. 4 illustrates a radio frame structure in the LTE system.

Referring to FIG. 4, a radio frame is 10 ms (327,200 $T_s$) in duration. The radio frame is divided into 10 equal-sized subframes, each subframe being 1 ms long. Each subframe is further divided into two slots, each slot of 0.5 ms (15,360 $T_s$) duration. $T_s$ represents a sampling time and is given as $T_s=1/(15\ kHz \times 2048)=3.2552 \times 10^{-8}$ (about 33 ns). A slot is defined by a plurality of orthogonal frequency division multiplexing (OFDM) symbols in time by a plurality of resource blocks (RBs) in frequency. One RB has 12 subcarriers by 7 (6) OFDM symbols in the LTE system. A unit time in which data is transmitted, known as Transmission Time Interval (TTI) may be defined by one or more subframes. This radio frame structure is purely exemplary and thus the number of subframes in a radio frame, the number of slots in a subframe, or the number of OFDM symbols in a slot may vary.

Figure 5:
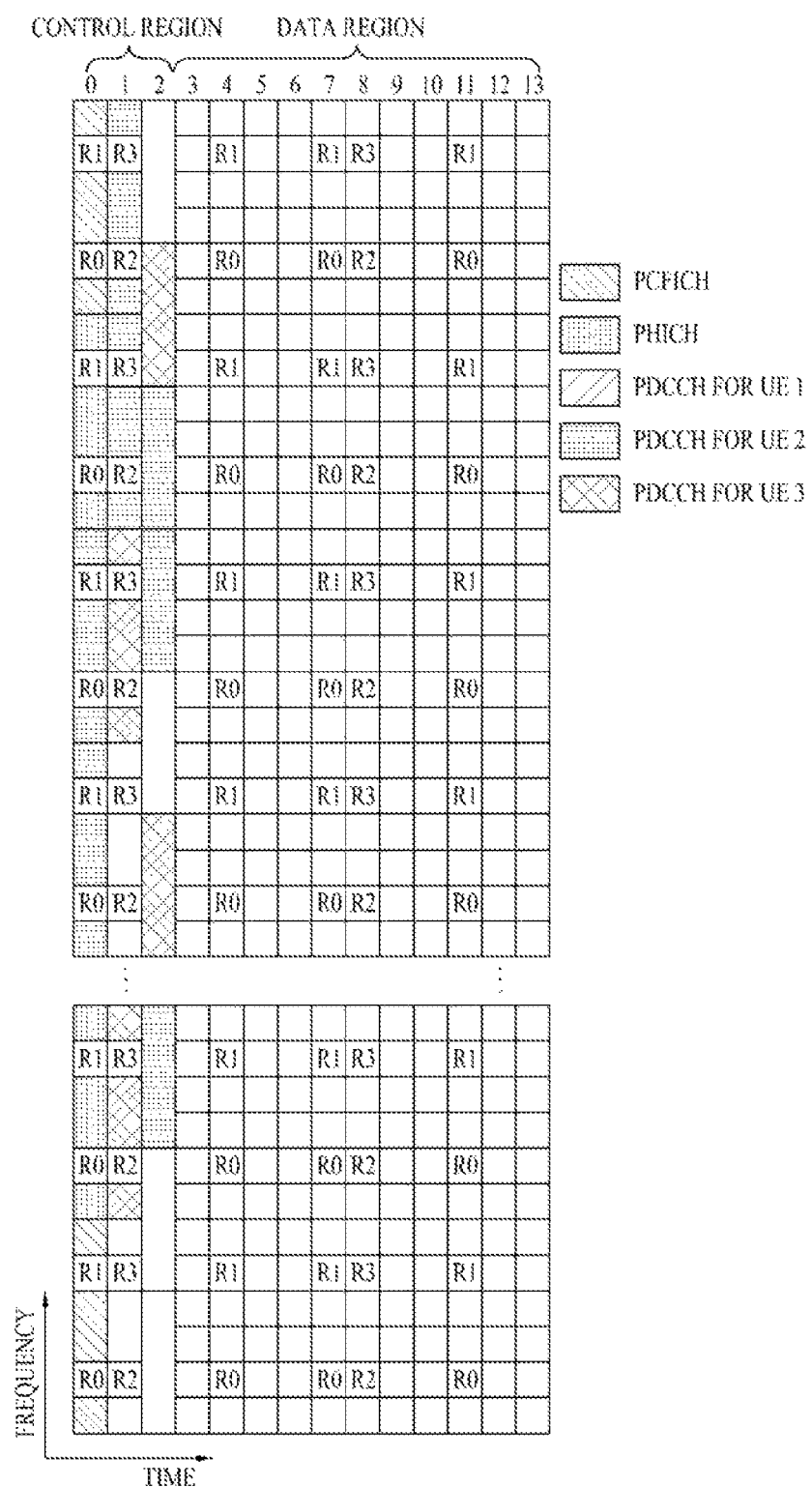
FIG. 5 illustrates an exemplary downlink subframe structure in the LTE system.

FIG. 5 illustrates exemplary control channels included in the control region of a subframe in a downlink radio frame.

Referring to FIG. 5, a subframe includes 14 OFDM symbols. A control region occupies the first one to three OFDM symbols and a data region occupies the other 13 to 11 OFDM symbols in the subframe according to the configuration of the subframe. In FIG. 5, reference characters R0 to R3 denote Reference Signals (RSs) or pilot signals for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a physical control format indicator channel (PCFICH), a physical hybrid-arq indicator channel (PHICH), a physical downlink control channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four resource element groups (REGs), each REG being distributed across the control region based on a cell Identity (ID). One REG has four REs. An RE is a minimum physical resource defined as one subcarrier by one OFDM symbol. A PCFICH value, which is modulated in quadrature phase shift keying (QPSK), ranges from 1 to 3 or from 2 to 4 according to a bandwidth.

The PHICH carries an HARQ ACK/NACK for uplink transmission. That is, the PHICH is a channel used to deliver an HARQ ACK/NACK for uplink HARQ. The PHICH includes one REG and is scrambled cell-specifically. The ACK/NACK is indicated in one bit and modulated in binary phase shift keying (BPSK). The modulated ACK/NACK is spread with a spreading factor (SF) of 2 or 4. A plurality of PHICHs mapped to the same resources form a PHICH group. The number of PHICHs multiplexed into a PHICH group is determined according to the number of spreading codes. The same PHICH (group) occurs three times, for achieving a diversity gain in the frequency and/or time domain.

A PDCCH is allocated to the first n OFDM symbols of a subframe. n is 1 or a larger integer indicated by the PCFICH. The PDCCH includes one or more control channel elements (CCEs). The PDCCH is used to inform a UE or a UE group of the resource allocation of transport channels, namely a PCH and a downlink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, if the cyclic redundancy check (CRC) of a particular PDCCH is masked by radio network temporary identity (RNTI) "A" and information about data transmitted in radio resources "B" (e.g. a frequency position) with DCI format "C" being a transport format (e.g. a transport block (TB) size, a modulation scheme, coding information, etc.) is transmitted in a particular subframe, UEs within the cell of the eNB monitor the PDCCH using their RNTI information. If one or more UEs have RNTI "A", the UEs receive the PDCCH and receive a PDSCH indicated by "B" and "C" based on the received information of the PDCCH.

Figure 6:
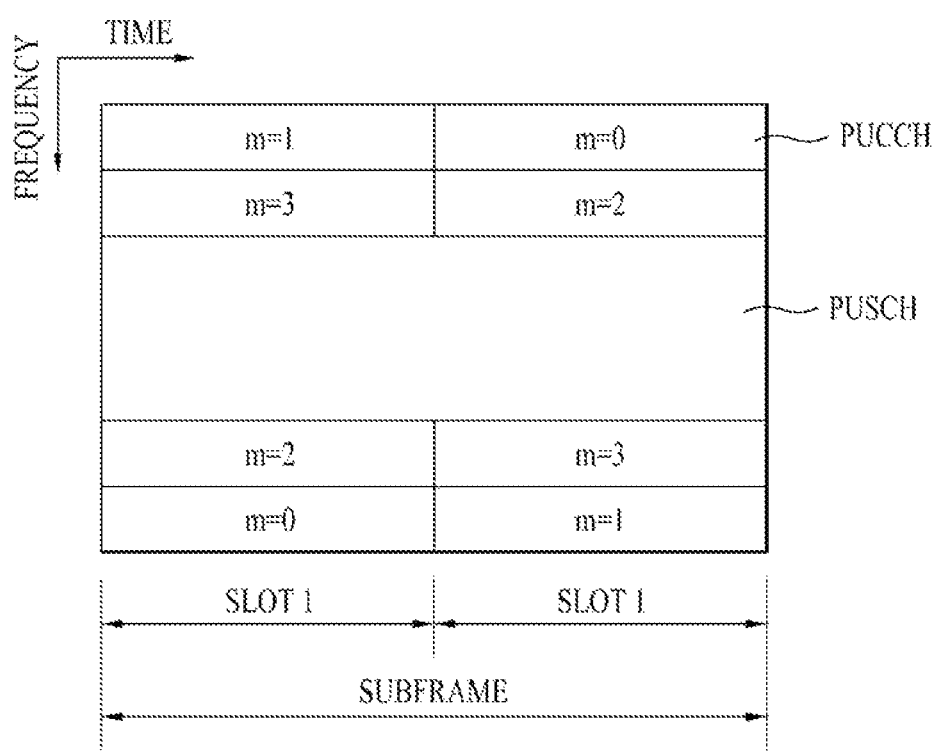
FIG. 6 illustrates an exemplary uplink subframe structure in the LTE system.

FIG. 6 illustrates an uplink subframe structure in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for multiple input and multiple output (MIMO), a scheduling request (SR) being a request for allocation of uplink resources, etc. A PUCCH of a UE occupies RBs in different frequencies in the slots of a subframe. That is, two RBs allocated to the PUCCH frequency-hop over the slot boundary. Particularly, FIG. 6 illustrates an example in which PUCCHs for which m=0, m=1, m=2 and m=3, respectively are allocated to a subframe.

Now a description will be given of a multiple input multiple output (MIMO) system. MIMO can increase the transmission and reception efficiency of data by using a plurality of transmission (Tx) antennas and a plurality of reception (Rx) antennas. That is, with the use of multiple antennas at a transmitter or a receiver, MIMO can increase capacity and improve performance in a wireless communication system. The term "MIMO" is interchangeable with "multi-antenna".

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
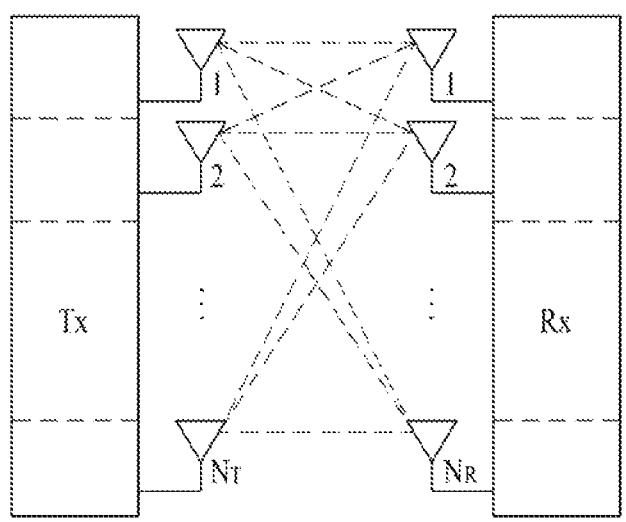
FIG. 7 illustrates the configuration of a typical multiple input and multiple output (MIMO) communication system.

FIG. 7 illustrates the configuration of a typical MIMO communication system. Referring to FIG. 7, a transmitter has $N_T$ Tx antennas and a receiver has $N_R$ Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

NT transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by [Equation 5]. Herein, $w_{ij}$ denotes a weight between a jth piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} \qquad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams is transmitted through a plurality of antennas, this may be spatial multiplexing. Needless to say, a hybrid scheme of spatial diversity and spatial multiplexing in combination may be contemplated.

Channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO Tx antennas. To acquire CSI from the UE, the eNB may transmit a reference signal (RS) to the UE and may command the UE to feedback measured CSI on a PUCCH or PUSCH.

CSI is classified largely into three information types, RI, PMI, and CQI. An RI is information about a channel rank, as described before. The channel rank is the number of streams that a UE can receive in the same time-frequency resources. Because the RI is determined mainly according to the long-term fading of a channel, the RI may be fed back to an eNB in a longer period than a PMI and a CQI.

Second, a PMI is the index of a UE-preferred eNB precoding matrix determined based on a metric such as signal to interference and noise ratio (SINR), reflecting the spatial characteristics of channels. A CQI represents a channel strength. In general, the CQI reflects a reception SINR that the eNB can achieve with a PMI.

An advanced system such as an LTE-A system considers achievement of an additional multi-user diversity by the use of multi-user MIMO (MU-MIMO). Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in Single User MIMO (SU-MIMO) should be reported in MU-MIMO.

In this context, the LTE-A standard designs a final PMI separately as a long-term and/or wideband PMI, W1 and a short-term and/or subband PMI, W2.

For example, the long-term covariance matrix of channels expressed as [Equation 8] may be used for hierarchical codebook transformation that configures one final PMI with W1 and W2.

$$W = \text{norm}(W1 \, W2) \qquad \text{[Equation 8]}$$

In [Equation 8], W2 is a short-term PMI, which is a codeword of a codebook reflecting short-term channel information, W is a codeword of a final codebook, and norm(A) is a matrix obtained by normalizing the norm of each column of matrix A to 1.

Conventionally, the codewords W1 and W2 are given as [Equation 9].

$$W1(i) = \begin{bmatrix} X_i & 0 \\ 0 & X_i \end{bmatrix}, \qquad \text{[Equation 9]}$$

where $X_i$ is Nt/2 by M matrix.

$$W2(j) = \begin{bmatrix} \overbrace{e_M^k \quad e_M^l \quad e_M^m}^{r\ columns} \\ \alpha_j e_M^k \quad \beta_j e_M^l \quad \gamma_j e_M^m \end{bmatrix}$$

(if rank=r), where $1 \leq k, l, m \leq M$ and k,l,m are integer.

In [Equation 9], Nt denotes the number of Tx antennas, M is the number of columns of a matrix $X_i$ and represents that the matrix $X_i$ includes M candidate column vectors, and $e_M^k$, $e_M^l$ and $e_M^m$ respectively indicate k-th, l-th and m-th column vectors in which only k-th, l-th and m-th elements from among M elements are 1 and the remaining elements are 0. In addition, $\alpha_j$, $\beta_j$ and $\gamma_j$ are complex values having unit norm and represent application of phase rotation to the k-th, l-th and m-th column vectors of the matrix $X_i$. Furthermore, i is an integer greater than 0 and denotes a PMI indicating W1 and j is an integer greater than 0 and denotes a PMI indicating W2.

In [Equation 9], the codewords are designed so as to reflect correlation characteristics between established channels, if cross polarized antennas are arranged densely, for example, the distance between adjacent antennas is equal to or less than a half of a signal wavelength. The cross polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is eventually quantized values of channels, it is necessary to design a codebook, reflecting channel characteristics. For the convenience of description, a rank-1 codeword designed in the above manner may be given as [Equation 10].

$$W1(i) * W2(j) = \begin{bmatrix} X_i(k) \\ \alpha_j X_i(k) \end{bmatrix}$$ [Equation 10]

In [Equation 10], a codeword is expressed as an $N_T \times 1$ vector where $N_T$ is the number of Tx antennas and the codeword is composed of an upper vector $X_i(k)$ and a lower vector $\alpha_i X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a Discrete Fourier Transform (DFT) matrix may be used for $X_i(k)$.

As described above, in the LTE system, CSI includes a CQI, PMI and RI although it is not limited thereto, and all or some of the CQI, PMI and RI are transmitted according to the transmission mode of each UE. Periodic transmission of CSI is referred to as periodic reporting and transmission of CSI at the request of an eNB is referred to as aperiodic reporting. In the case of aperiodic reporting, a request bit included in uplink scheduling information transmitted from the eNB is sent to a UE. Then the UE transmits CSI considering a transmission mode thereof to the eNB through a PUSCH. In the case of periodic reporting, a period and an offset of the period are semi-statically signaled to each UE through a higher layer signal on a subframe basis. Each UE delivers CSI considering the transmission mode thereof to the eNB through a PUCCH in a predetermined period. If uplink data is present in a subframe in which CSI is transmitted, the CSI is transmitted with the uplink data through a PUSCH. The eNB transmits transmission timing information suitable for each UE to each UE in consideration of channel state of each UE, UE distribution in a cell, etc. The transmission timing information includes a period in which CSI is transmitted, an offset, etc. and may be transmitted to each UE through an RRC message.

FIGS. 8 to 11 illustrate periodic CSI reporting in LTE.

Referring to FIG. 8, 4 CQI reporting modes are present in LTE. Specifically, the CQI reporting modes are categorized into a wideband (WB) CQI mode and a subband (SB) CQI mode according to CQI feedback type and into a no PI mode and a single PMI mode according to whether a PMI is transmitted. Each UE receives information composed of a combination of a period and an offset through RRC signaling for periodic CQI reporting.

Figure 9:
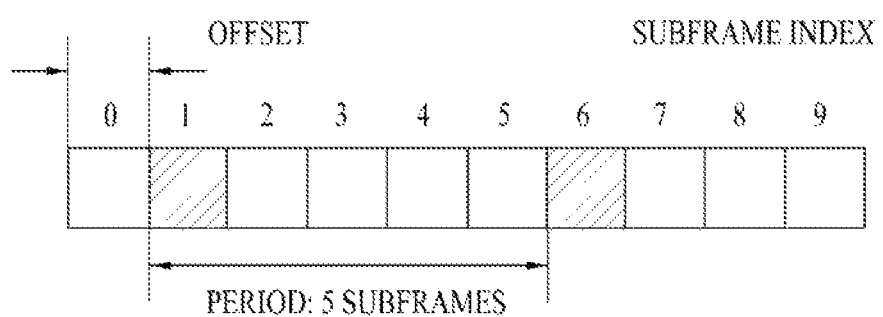

FIG. 9 illustrates an example of transmitting CSI when information representing {period '5', offset '1'} is signaled to a UE. Referring to FIG. 9, upon reception of the information representing a period of '5' and an offset of '1', the UE transmits CSI in 5 subframes with an offset corresponding to one subframe from subframe #0 in a direction in which the subframe index increases. While the CSI is basically transmitted through a PUCCH, when a PUSCH for transmitting data is present in the same time, the CSI is transmitted with the data through the PUSCH. The subframe index is composed of a system frame number (or a radio frame index) $n_f$ and a slot index $n_s$ (0 to 19). Since a subframe includes two slots, the subframe index can be defined by $10*n_f+\text{floor}(n_s/2)$. Here, floor( ) denotes a floor function.

A scheme of transmitting a WB CQI only and a scheme of transmitting both the WB CQI and SB CQI are present. According to the scheme of transmitting the WB CQI only, CQI information about the overall band is transmitted in subframes corresponding to a CQI transmission period. When a PMI also needs to be transmitted according to PMI feedback type, as illustrated in FIG. 8, the PMI and CQI are transmitted together. According to the scheme of transmitting both the WB CQI and SB CQI, the WB CQI and SB CQI are alternately transmitted.

Figure 10:
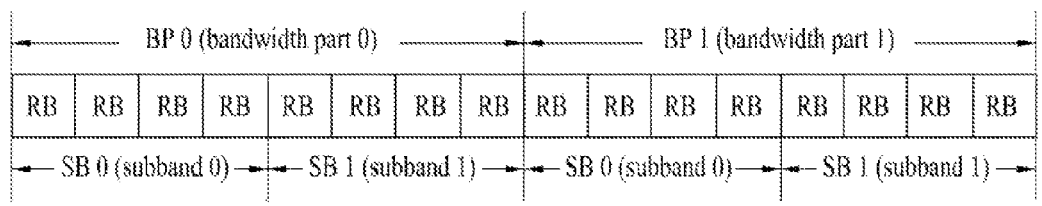
Figure 11:
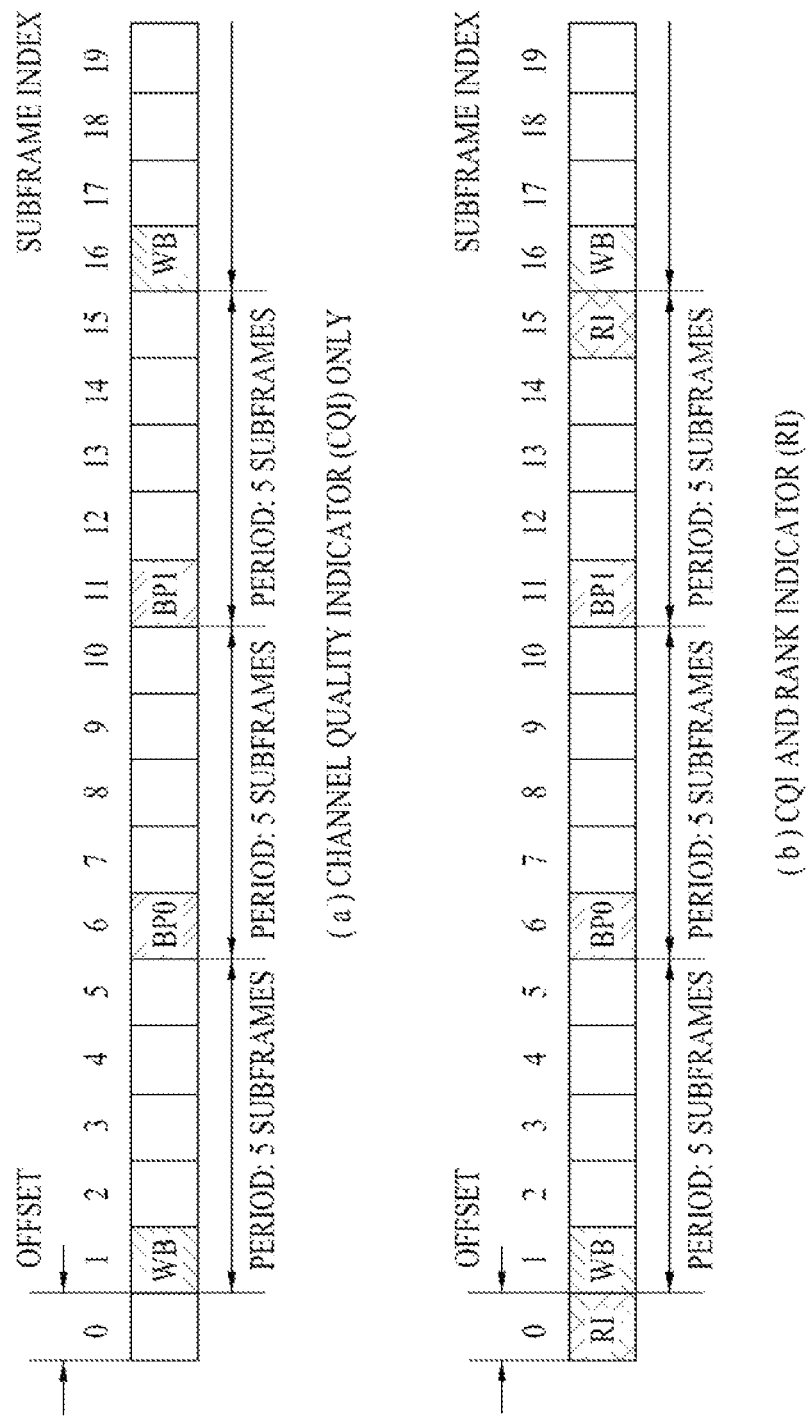

FIG. 10 illustrates a system having a system bandwidth corresponding to 16 RBs. In this case, it is assumed that the system bandwidth is composed of two bandwidth parts (BPs) BP0 and BP1 each of which includes two subbands (SBs) SB0 and SB1 each of which is composed of 4 RBs. However, the number of BPs and the size of each SB may be varied according to system bandwidth. Furthermore, the number of SBs constituting each BP may depend on the number of RBs, the number of BPs and SB size.

In the case of the scheme of transmitting both the WB CQI and SB CQI, the WB CQI is transmitted in a first CQI transmission subframe and a CQI corresponding to the SB having a good channel state between SB0 and SB1 belonging to BP0 and the index of the corresponding SB are transmitted in the next CQI transmission subframe. Then, a CQI corresponding to the SB in good channel state between SB0 and SB1 belonging to BP1 and the index of the corresponding SB are transmitted in the next CQI transmission subframe. In this manner, the WB CQI is transmitted and then CQI information about respective BPs is sequentially transmitted. CQI information about BPs can be sequentially transmitted one to four times between two WB CQIs. For example, if CQI information about BPs is sequentially transmitted once between two WB CQIs, the CQI information can be transmitted in the order of WB CQI=>BP0 CQI=>BP1 CQI=>WB CQI. If CQI information about BPs is sequentially transmitted four times between two WB CQIs, the CQI information can be transmitted in the order of WB CQI=>BP0 CQI=>BP1 CQI=>BP0 CQI=>BP1 CQI=>BP0 CQI=>BP1 CQI=>BP0 CQI=>BP1

CQI=>WB CQI. Information about how many times each BP CQI is sequentially transmitted is signaled by a higher layer (e.g. RRC layer).

FIG. 11(a) illustrates an example of transmitting both the WB CQI and SB CQI when information representing {period '5', offset '1'} is signaled to a UE. Referring to FIG. 11(a), a CQI can be transmitted only in subframes corresponding to a signaled period and offset irrespective of CQI type. FIG. 11(b) illustrates a case in which an RI is additionally transmitted. The RI can be signaled by a higher layer (e.g. RRC layer) as a combination of information about a multiple of the WB CQI transmission period, which corresponds to an RI transmission period, and an offset in the RI transmission period. The offset of the RI is signaled as a value relative to the offset of the CQI. For example, if the offset of the CQI is '1' and the offset of the RI is '0', the RI has the same offset as that of the CQI. The offset of the RI is defined as 0 or a negative value. Specifically, FIG. 11(b) assumes a case in which the RI transmission period is equal to the WB CQI transmission period and the offset of the RI is '−1' in the same environment as FIG. 11(a). The RI transmission period is identical to the WB CQI transmission period since the RI transmission period is equal to the WB CQI transmission period. The offset of the RI is '−1', and thus the RI is transmitted on the basis of '−1' (i.e. subframe #0) with respect to the CQI offset '1'. When the RI offset is '0', the WB CQI transmission subframe and RI transmission subframe overlap. In this case, the WB CQI is dropped and the RI is transmitted.

Figure 12:
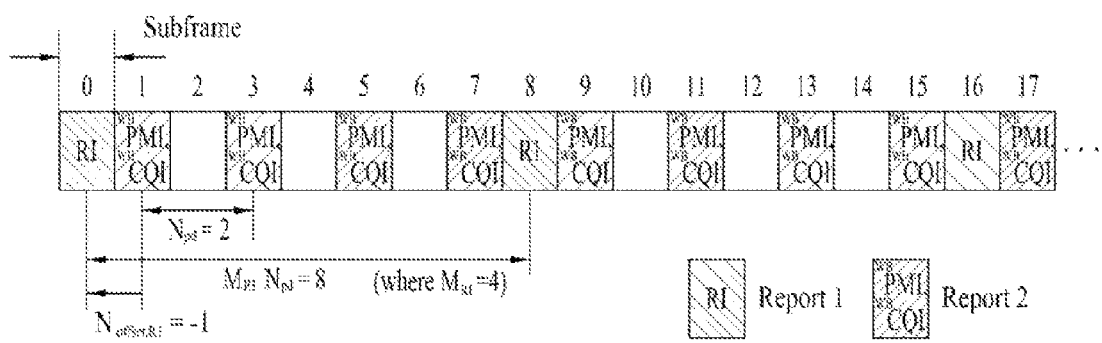
FIGS. 12 and 13 illustrate a process of periodically reporting CSI for use of non-hierarchical codebook.

FIG. 12 illustrates CSI feedback in the case of Mode 1-1 of FIG. 8.

Referring to FIG. 12, the CSI feedback is composed of two types of report contents Report 1 and Report 2. In detail, RI is transmitted on Report 1 and WB PMI and WB CQI are transmitted on Report 2. Report 2 is transmitted in a subframe index that satisfies $(10*n_f+\text{floor}(n_s/2)-N_{offset,CQI})\bmod(N_{pd})=0$. $N_{offset,CQI}$ is an offset value for transmission of PMI/CQI exemplified in FIG. 9 and FIG. 12 illustrates the case of $N_{offset,CQI}=1$. $N_{pd}$ is a subframe interval between adjacent Reports 2 and FIG. 12 illustrates the case of $N_{pd}=2$. Report 1 is transmitted in a subframe index that satisfies $(10*n_f+\text{floor}(n_s/2)-N_{offset,CQI}-N_{offset,RI})\bmod(M_{RI}*N_{pd})=0$. $M_{RI}$ is determined via higher layer signaling. In addition, $N_{offset,RI}$ corresponds to a relative offset value for transmission of RI exemplified in FIG. 11. FIG. 12 illustrates the case of $M_{RI}=4$ and $N_{offset,RI}=-1$.

Figure 13:
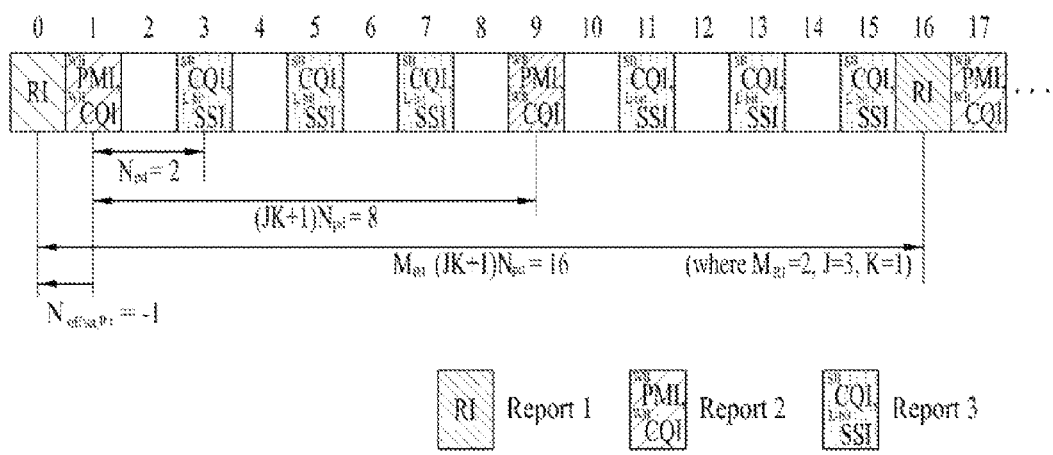

FIG. 13 illustrates CSI feedback in the case of Mode 2-1 of FIG. 8.

Referring to FIG. 13, CSI feedback is achieved by transmission of three types of report content, Report 1, Report 2 and Report 3. Specifically, an RI is transmitted through Report 1, a WB PMI and a WB CQI are transmitted through Report 2 and a subband (SB) CQI and an L-bit subband selection indicator (SSI) are transmitted through Report 3. Report 2 or Report 3 is transmitted in a subframe corresponding to a subframe index that satisfies $(10*n_f+\text{floor}(n_s/2)-N_{offset,CQI})\bmod(N_{pd})=0$. Particularly, Report 2 is transmitted in a subframe corresponding to a subframe index that satisfies $(10*n_f+\text{floor}(n_s/2)-N_{offset,CQI})\bmod(H\cdot N_{pd})=0$. Accordingly, Report 2 is transmitted at an interval of $H*N_{pd}$ and subframes disposed between neighboring Reports 2 are used to transmit Report 3. In this case, H=J·K+1 where J is the number of bandwidth parts (BPs). K indicates the number of continuously performed full cycles each of which carries out a process for selecting a subband from each BP and transmitting the selected subband for all BPs and is determined through higher layer signaling. FIG. 13 illustrates a case in which $N_{pd}=2$, J=3 and K=1. Report 1 is transmitted in a subframe corresponding to a subframe index that satisfies $(10*n_f+\text{floor}(n_s/2)-N_{offset,CQI}-N_{offset,RI})\bmod(M_{RI}*(J*K+1)*N_{pd})=0$. FIG. 13 illustrates the case of $M_{RI}=2$ and $N_{offset,RI}=-1$.

FIG. 14 illustrates periodic CSI reporting, which is being discussed in LTE-A. In the case of mode X-1, LTE-A sets a precoder type indication (PTI) parameter which is a 1-bit indicator and considers two types of subdivided periodic reporting modes according to PTI values, as illustrated in FIG. 14. In FIGS. 14, W1 and W2 are codewords constituting a hierarchical codebook described with reference to Equations 8 and 9. Both W1 and W2 need to be determined in order to set a precoding matrix W accomplished by combining W1 and W2.

Referring to FIG. 14, in the case of periodic reporting, different reports corresponding to Report 1, Report 2 and Report 3 are transmitted in different repetition periods. Report 1 reports an RI and a 1-bit PTI value. Report 2 reports WB W1 (when PTI=0) or WB W2 and a WB CQI (when PTI=1). Report 3 reports WB W2 and WB CQI (when PTI=0) or SB W2 and SB CQI (when PTI=1).

Report 2 and Report 3 are transmitted in subframes (referred to as a first subframe set for convenience) having subframe indices that satisfy $(10*n_f+\text{floor}(n_s/2)-N_{offset,CQI})\bmod(N_c)=0$. $N_{offset,CQI}$ corresponds to the offset value illustrated in FIG. 9 and $N_c$ denotes a subframe spacing between neighboring Reports 2 or Reports 3. FIG. 14 illustrates a case in which $N_{offset,CQI}=1$ and $N_c=2$. The first subframe set is composed of subframes having odd-numbered indices. Furthermore, $o_f$ denotes a system frame number (or radio frame index), $n_s$ denotes a slot index in a radio frame, floor( ) represents a floor function and 'A mod B' represents the remainder obtained by dividing A by B.

Report 2 is located in some subframes in the first subframe set and Report 3 is located in the remaining subframes. Specifically, Report 2 is located in subframes having subframe indices that satisfy $(10*n_f+\text{floor}(n_s/2)-N_{offset,CQI})\bmod(H*Nc)=0$. Accordingly, Report 2 is transmitted at an interval of $H\cdot N_c$ and one or more first subframes disposed between neighboring Reports 2 are used to transmit Report 3. When PTI=0, H=M and M is determined by higher layer signaling. FIG. 14 illustrates a case in which M=2. When PTI=1, H=J·K+1, K is determined by higher layer signaling and J denotes the number of BPs. FIG. 14 illustrates a case in which J=3 and K=1.

Report 1 is transmitted in subframes having subframe indices that satisfy $(10*n_f+\text{floor}(n_s/2)-N_{offset,CQI}-N_{offset,RI})\bmod(M_{RI}*(J*K+1)*Nc)=0$. $M_{RI}$ is determined by higher layer signaling. $N_{offset,RI}$ denotes a relative offset value for an RI. FIG. 14 illustrates a case in which $M_{RI}=2$ and $N_{offset,RI}=-1$. Report 1 transmission timing does not correspond to Report 2 transmission timing according to $N_{offset,RI}=-1$. When a UE calculates the RI, W1 and W2, the RI, W1 and W2 are related to one another. For example, W1 and W2 are calculated based on the RI and W2 is calculated based on W1. Upon reporting of Report 2 and Report 3 after Report 1, the corresponding eNB can be aware of a final W from W1 and W2.

LTE-A is expected to support coordinated multi-point (CoMP) transmission, which was not supported in any legacy standards, in order to improve data rate. CoMP transmission refers to a scheme through which two or more points (e.g. eNBs or cells) communicate with UEs in cooperation with each other to improve the performance of communication between a UE and an eNB (cell or sector) located in a shadow area.

CoMP transmission schemes may be categorized into joint processing (CoMP-JP) in the form of coordinated MIMO through data sharing and scheduling/beamforming (CoMP-CS/CB).

In the case of downlink, a UE can simultaneously receive data from plural eNBs that perform CoMP transmission and improve reception performance by combining signals received from the eNBs according to CoMP-JP (Joint transmission (JT)). A method by which one of eNBs that perform CoMP transmission transmits data to the UE at a specific time (dynamic point selection (DPS) may be considered. According to CoMP-CS/CB, the UE can instantaneously receive data from an eNB, that is, a serving eNB through beamforming.

When CoMP-JP is applied to uplink transmission, a plurality of eNBs can simultaneously receive a PUSCH signal from a UE (Joint Reception (JR)). In the case of CoMP-CS/CB, only one eNB can receive a PUSCH. Employment of CoMP-CS/CB can be determined by coordinated cells (or eNBs).

A UE using a CoMP transmission scheme, that is, a CoMP UE may feedback (referred to as CSI feedback) channel information to a plurality of eNBs that perform the CoMP transmission scheme. A network scheduler may select an appropriate CoMP transmission scheme for enhancing a transmission rate among CoMP-JP, CoMP-CS/CB, and DPS schemes based on CSI feedback. To this end, as a method for CSI feedback configuration by the CoMP UE in a plurality of eNBs that perform a CoMP transmission scheme, a periodic feedback transmission scheme using uplink PUCCH may be used. In this case, feedback configurations of eNBs may be independent of each other. Accordingly, according to an embodiment of the present invention, throughout this specification, a feedback operation of channel information using the independent feedback configuration is referred to as a CSI process. One or more CSI processes may exist in one serving cell.

An embodiment of the present invention proposes an effective feedback method for configuring the same channel rank value in order to support a CoMP operation when a CoMP UE periodically feeds back channel information from a plurality of cells in downlink in a multi-cell wireless communication system.

The CoMP UE estimates a channel using an RS, determines an appropriate channel rank for a transmission status of each channel, and reports the channel rank as RI. In this case, in order to smoothly perform the CoMP-JP, it is advantageous to perform CSI feedback such that the CoMP UE has a common RI value during channel feedback on a plurality of cells. In the periodic CSI feedback, RI, first PMI, second PMI, CQI, etc. that are associated with each other are separated with a predetermined pattern and transmitted according to a feedback mode rather than simultaneously being transmitted due to limited capacity of PUCCH. When a CoMP UE performs a plurality of CSI feeds back on multi cells, feedback period, feedback offset, and/or the like as feedback configuration may differ for the respective cells. In this case, changing timing of an RI value may not be the same for all feedback configurations and the accuracy of information such as PMI, CQI, etc. associated with the RI may be degraded. Accordingly, an embodiment of the present invention proposes an effective support method in which a CoMP UE maintains the accuracy of PMI and CQI information while having a reference RI value during a plurality of periodic CSI processes.

Since RI, PMI, and CQI values as components of CSI feedback are associated with each other, when one value is changed and feedback, channel information recombined by a network scheduler may become very inaccurate. In addition, when PMI information is divided into W1 as first PMI indicating long-term information and W2 as second PMI indicating short-term information, these two values are also associated with each other. Thus when one piece of information is changed and two values are recombined, a very inaccurate PMI value may be obtained. Accordingly, in the case of associated information, even if an RI value is changed in the middle of a period, when the original RI value is used for analysis, CSI feedback information may be more accurate.

Figure 15:
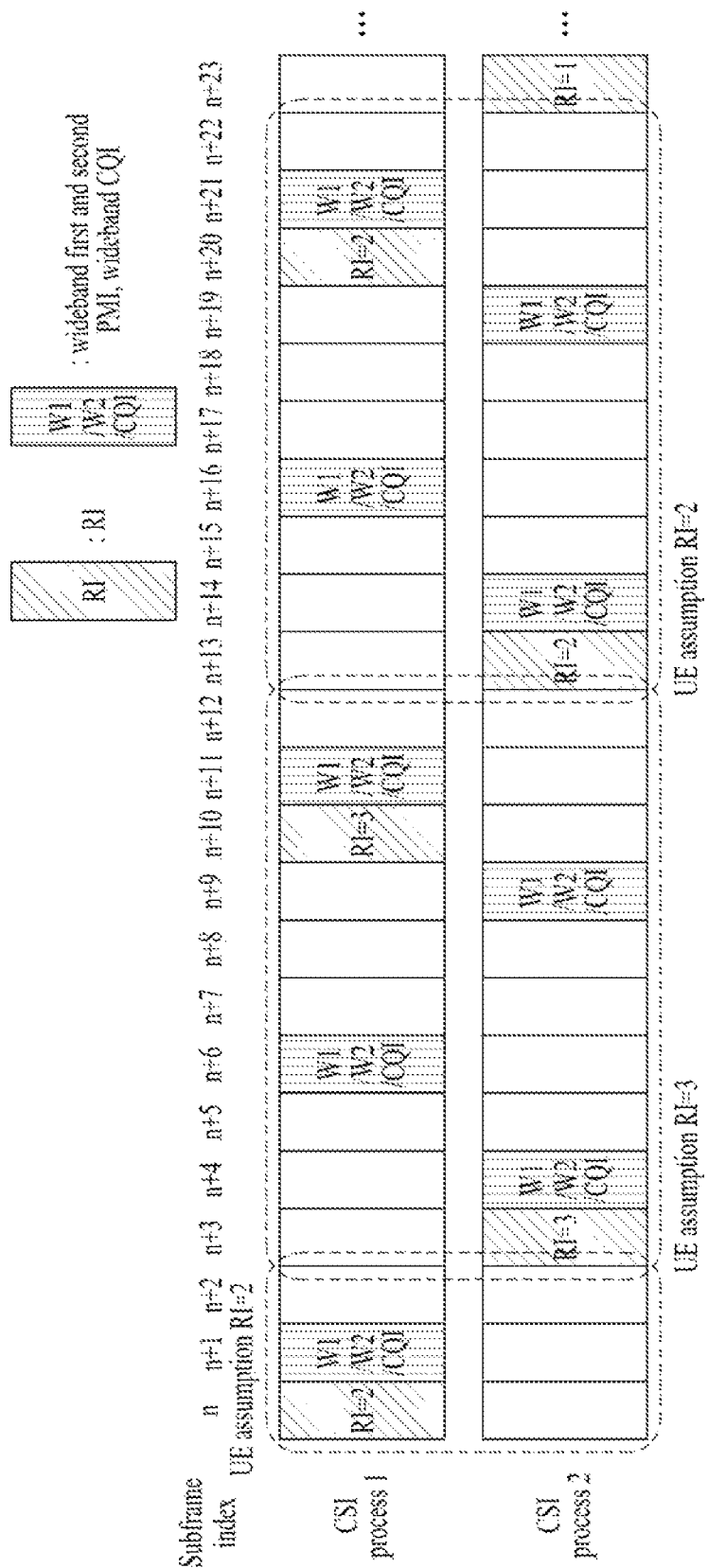
FIG. 15 illustrates a case in which a CoMP UE periodically performs wideband (WB) feedback according to an embodiment of the present invention.

FIG. 15 illustrates a case in which a CoMP UE periodically performs WB feedback according to an embodiment of the present invention. The CoMP UE may perform CSI feedback of periodically reporting channel information on Cells 1 and 2 as two cells that participate in a CoMP transmission scheme (CSI processes 1 and 2). The CoMP UE may change an RI value to an appropriate RI value according to a channel situation at reporting timing (subframes –(n), n+3, n+10, n+13, n+20, n+23, . . . of FIG. 15) in two CSI processes and report the changed RI value. In the above example, the UE changes an RI value to 3 via a subframe –(n+3) of CSI process 2. In a feedback mode like in the example of FIG. 15, W1, W2, and CQI as associated information are fed back at the same timing as an RI value and thus may be simultaneously calculated and determined according to the changed RI value. The UE calculates and feeds back all pieces of PMI and CQI information based on a last reported RI value (RI=3 in the example of FIG. 15) in the two CSI processes before a next RI value is changed. Accordingly, irrespective of changing timing of an RI value, accurate channel information obtained by recombining RI, PMI, and CQI that are fed back by a network scheduler may be achieved. Alternatively, when a reference CSI process of setting a common RI value and a CSI process of calculating CSI based on RI of the reference CSI process are determined, the UE may calculate and feedback PMI and CQI information of the reference CSI process and CSI process of calculating CSI based on the RI of the reference CSI process based on a last reported RI value (RI=3 in the example of FIG. 15) in the reference CSI process.

Figure 16:
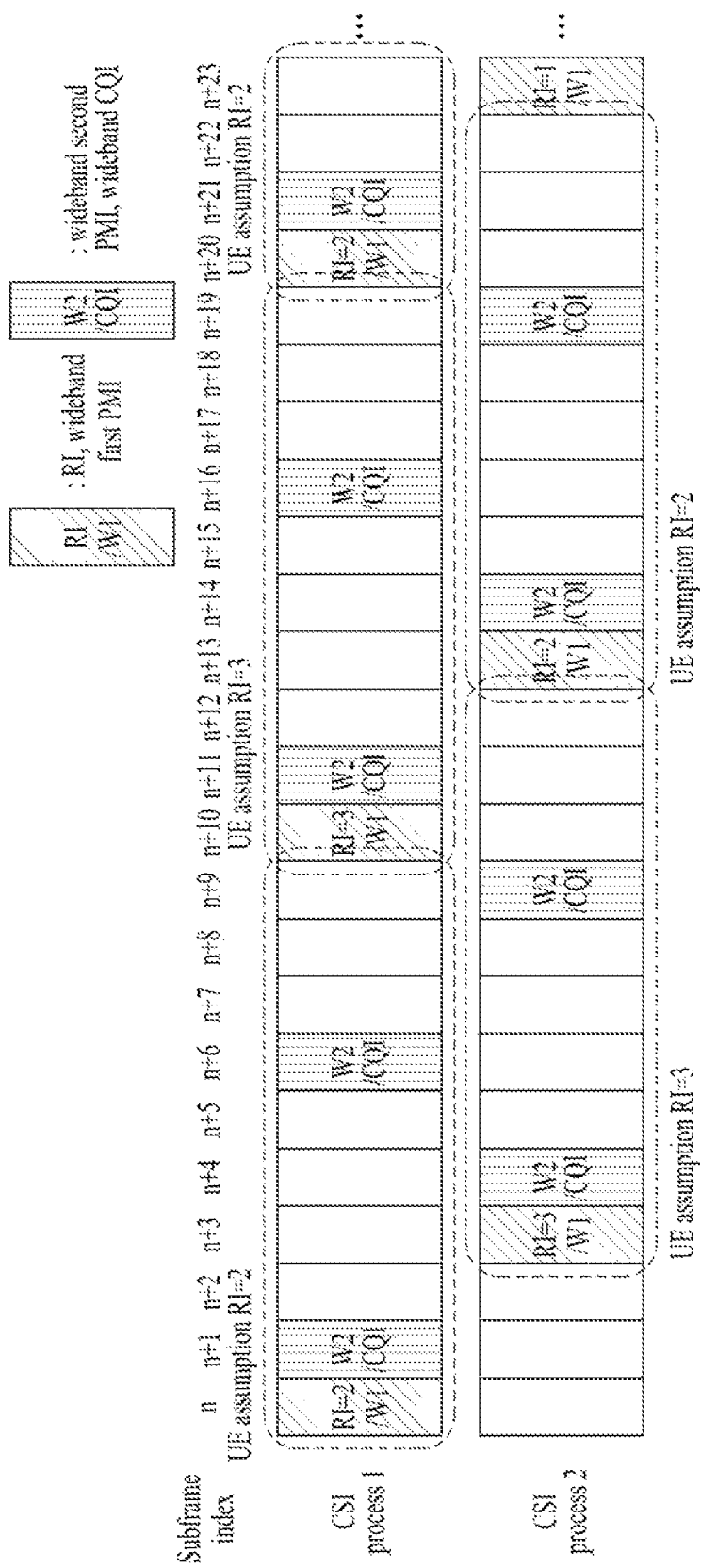
FIG. 16 illustrates another case in which a CoMP UE periodically performs WB feedback according to an embodiment of the present invention.

FIG. 16 illustrates another case in which a CoMP UE periodically performs WB feedback according to an embodiment of the present invention. FIG. 16 is different from FIG. 15 in that PMI and CQI are not reported at the same timing and W1 as long-term PMI and W2 as short-term PMI are separately reported at different timings. In this case, when a UE changes an RI value via one CSI process, the UE may not maintain association of a series of associated information via another CSI process. Referring to the example illustrated in FIG. 16, the UE changes an RI value to 2 in a subframe –(n) using CSI process 1. In this case, W1 as long-term PMI is reported together with the RI value via the CSI process 1. Then CQI information and W2 as short-term PMI information transmitted in subframes –(n+1) and (n+6) via the CSI process 1 needs to be recombined as information associated with the previously reported RI and W1 in order to achieve accurate channel information. When an RI value is changed 3 using the CSI process 2 like at timing of a subframe –(n+3), if the UE calculates and feeds back W2 and CQI based on an RI value that is changed at timing of a subframe –(n+6) via the CSI process 1, channel information recombined by a network scheduler may be accurate. In order to overcome this problem, even if an RI value is changed, a promise may be made between the UE and the network scheduler so as to assume an RI value that is used by a last reported W1 as a reference in the corresponding CSI process instead of the changed RI value before new W1 information is fed back. That is, in the example of FIG. 16, W2 and CQI information of a subframe −(n+6) may be recombined with RI and W1 information that are fed back at timing of subframe −(n) to achieve accurate channel information.

According to another embodiment of the present invention for accurate recombined channel information, like in the example of FIG. 16, when a plurality of pieces of associated channel information may be separately transmitted on periodic CSI feedback, the UE may configure the same RI feedback period and offset for all CSI processes. That is, when timings for changing an RI value are the same, RI, PMI, and CQI that are fed back by the network scheduler are recombined to achieve accurate channel information.

Figure 17:
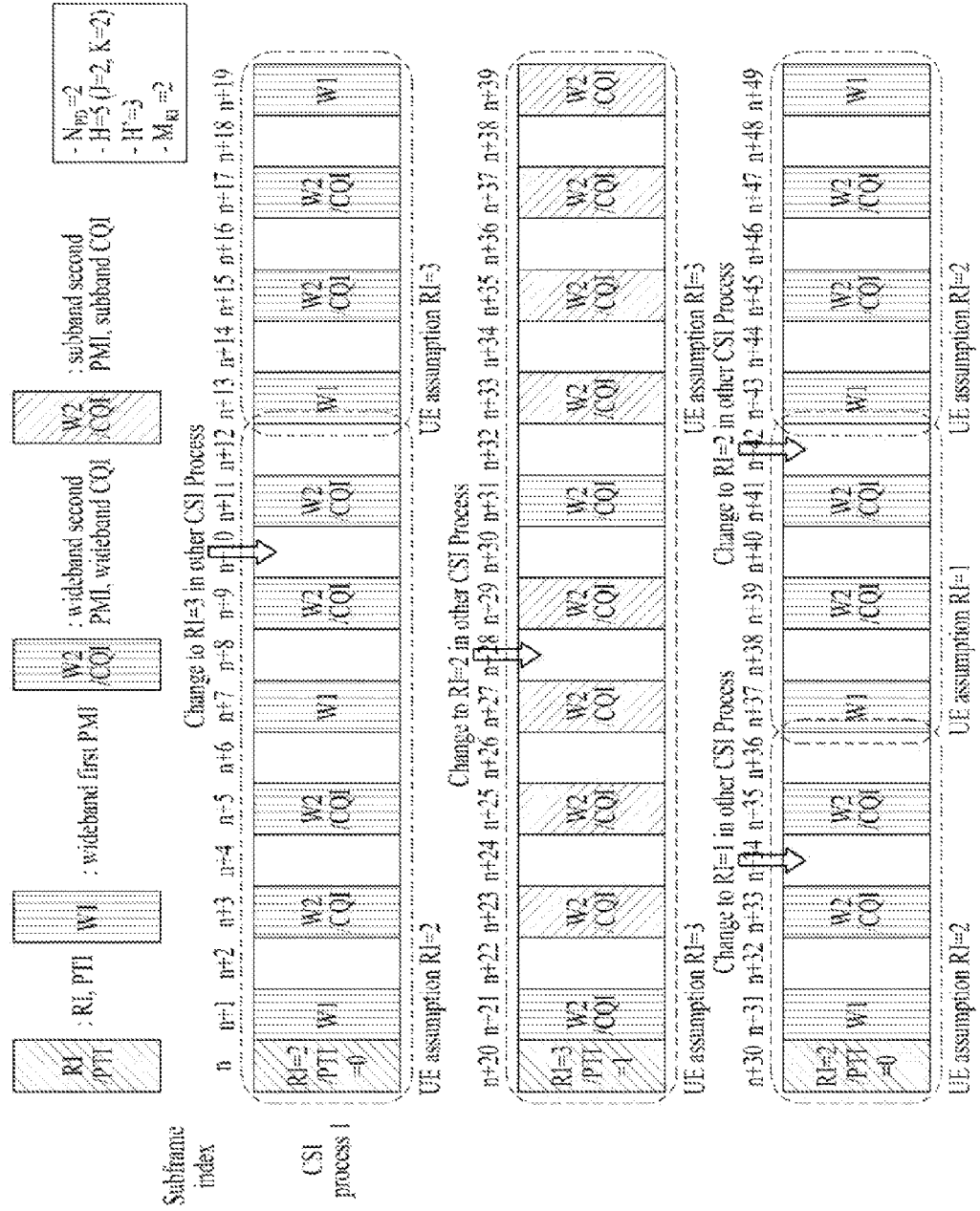
FIG. 17 is an example in which a CoMP UE periodically and simultaneously performs WB feedback and subband feedback.

FIG. 17 is an example in which a CoMP UE periodically and simultaneously performs WB feedback and subband feedback. FIG. 17 illustrates a case in which, from a viewpoint of one subband CSI process, an RI value is changed using another CSI process at timing indicated by an arrow when the UE has a plurality of CSI processes. Subband PMI information and wideband PMI information are also associated with each other like association between W1 as long-term PMI information and W2 as short-term PMI information and thus need to be recombined to achieve accurate channel information like in a network scheduler. Accordingly, during feedback transmission of a series of associated feedback information (e.g. WB W1-WB W2-B CQI or WB W1-WB W2-WB CQI-WB W2-WB CQI), PMI, CQI, etc. may not be calculated using the changed RI value. The UE may assume that an existing RI value is maintained until feedback of a series of pieces of associated information is terminated even if the RI value is changed in the middle of a period. As one detailed method, a changed RI value based on WB W1 (or WB W when W is not divided into W1 and W2) that is first feedback among a series of pieces of information may be applied. When an RI value is changed via one CSI process in the middle of a period of changing an RI value in another CSI process 1, the UE may not calculate PMI and CQI by applying the changed RI value directly to the CSI process 1 and may calculate and feedback PMI and CQI on the assumption that an existing RI value is maintained up to new WB W1 feedback timing. Then the UE calculates and feeds back PMI and CQI based on the changed RI value after the new WB W1 feedback timing. Similarly, it may be seen that a network scheduler assumes and feeds back an RI value as a reference used to calculate last reported WB W1 in a corresponding CSI process until new WB W1 is transmitted even if the RI value is changed in the middle of a period among a series of pieces of feedback information that are fed back via respective CSI processes. Accordingly, until the new WB W1 is transmitted, RI, PMI, and CQI information that are used to calculate last reported WB W1 in a corresponding CSI process may be recombined to achieve accurate channel information.

In the example of FIG. 17, the UE may assume an RI value as 2 in a subframe −(n) and sequentially perform feedback in the CSI process 1. In a subframe −(n+10), the UE changes an RI value to 3 through an RI transmission timing of another CSI process. In this case, when the UE calculates and feeds back WB W2 and WB CQI based on the changed RI value at timing of subframe −(n+11) of the CSI process 1, association with WB W1 calculated on the assumption of RI=2 at previous timing of subframe −(n+7) is disconnected. Accordingly, WB W2 and WB CQI are calculated and fed back on the assumption that the RI value is 2 as a reference used to calculate last reported WB W1 (that is, timing of subframe −(n+7)) in the CSI process 1 up to a subframe −(n+13) in which WB W1 that is newly calculated using the changed RI=3 can be fed back. From a subframe −(n+13), the changed RI value is applied to calculate WB W1, WB W2, and WB CQI and WB W1, WB W2, and WB CQI are calculated and fed back on the assumption that the RI value is 3. In order to recombine a series of pieces of information fed back in the CSI process 1 to achieve channel information, a network scheduler may recombine RI, PMI, and CQI on the assumption that RI=2 as a reference used to calculate last reported WB CQI in the CSI process 1 up to a subframe −(n+12) and recombine RI, PMI, and CQI on the assumption that the changed RI value changed via another CSI process is 3 from a subframe −(n+13). Similarly, the RI value is changed in subframes −(n+34) and (n+42) via the same process. Like in a subframe −(n+28), the RI value may be changed in the middle of subband PMI and CQI. The subband PMI and CQI need to be interpreted as information that is associated with the WB PMI and thus it is not appropriate to directly apply the changed RI value as described above. Accordingly, PMI and CQI may be calculated to enhance the accuracy of channel information on the assumption that an RI value is 3 as a reference at timing of last reported WB W1 (timing of subframe −(n+19)) up to a subframe −(n+39) before WB W1 is newly calculated in the corresponding CSI process 1.

In the aforementioned embodiment, when a UE has a plurality of CSI processes, an operation of changing an RI value in the respective CSI processes has been described. For the following embodiments of the present invention, it is assumed that an RI value is changed only in one CSI process among a plurality of CSI processes.

Figure 18:
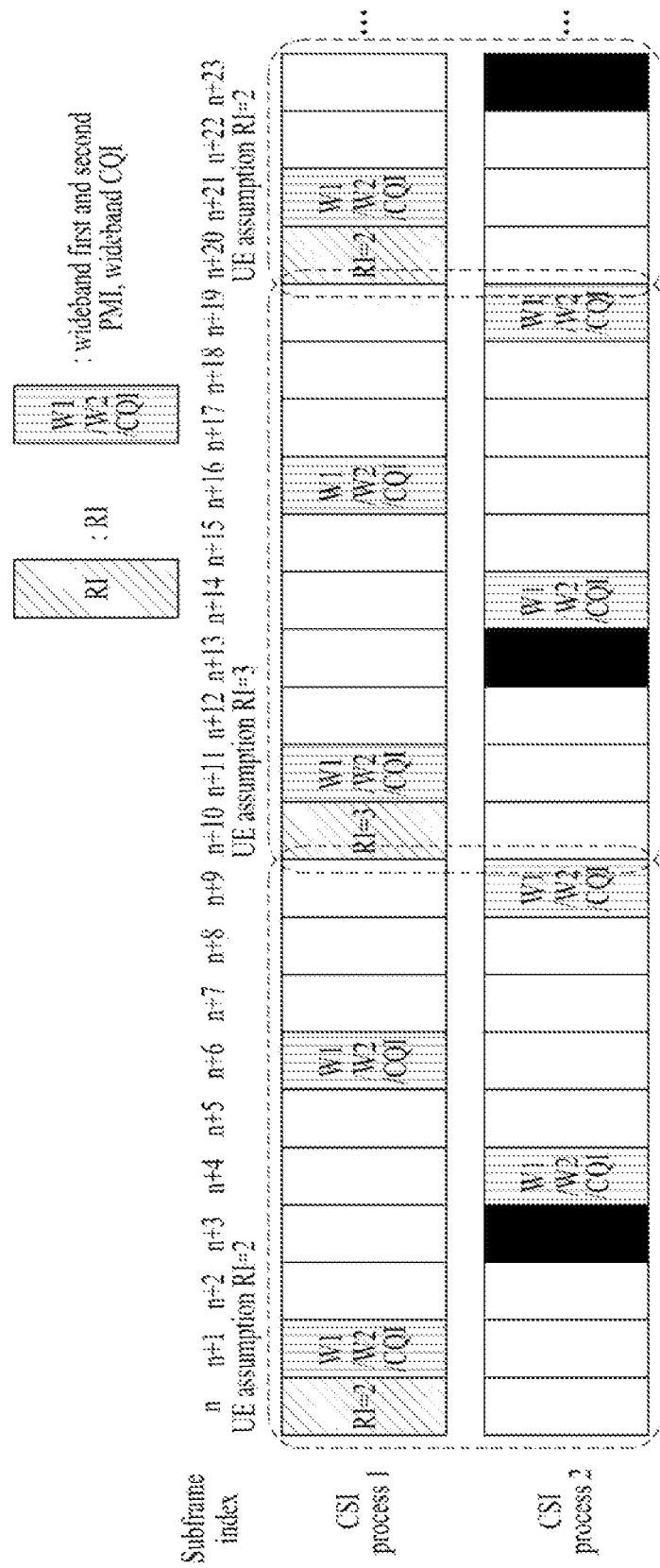
FIG. 18 illustrates a case in which an RI value can be changed only in one CSI process according to an embodiment of the present invention.

FIG. 18 illustrates a case in which an RI value can be changed only in one CSI process according to an embodiment of the present invention. A CSI process of changing an RI value may be explicitly indicated via RRC signaling. Alternatively, in a CSI process having a highest or lowest index during index configuration of the CSI process, an RI value may be previously (implicitly) configured to be changed. An operation in the CSI process 1 configured to change an RI value is the same as a prior method. In the CSI process 2 configured not to change an RI value, an RI value does not have to be fed back and thus no value may be transmitted at timing (subframes −(n+3), (n+13), and (n+23)) of feeding back an RI value (refer to the CSI process 2 of FIG. 18). Thus the CSI process 2 may be configured not to feedback an RI value. Accordingly, unnecessary feedback information may be reduced to reduce power consumption of a UE, thereby reducing uplink overhead occupied by control information.

Figure 19:
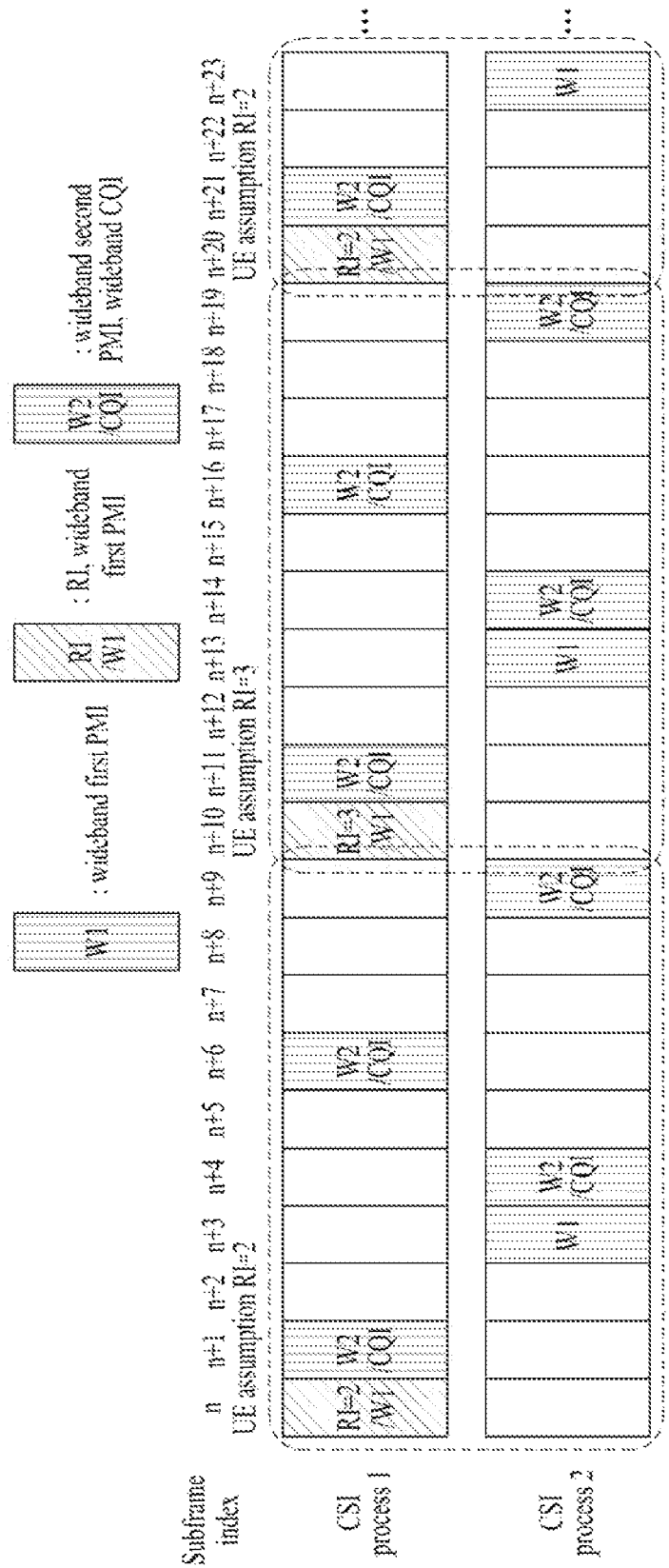
FIG. 19 illustrates another case in which an RI value can be changed only in one CSI process according to an embodiment of the present invention.

FIG. 19 illustrates another case in which an RI value can be changed only in one CSI process according to an embodiment of the present invention. The example of FIG. 19 corresponds to a feedback mode in which an RI value is joint-encoded like W1 at feedback timing. In the CSI process 2 configured not to change an RI value, only W1 may be transmitted at timing (in subframes −(n+3), (n+13), and (n+23)) of transmitting an RI value. In the case of the feedback mode in which an RI value and PMI are joint-encoded and simultaneously transmitted, W1, the information amount of which is reduced via subsampling, etc., may be transmitted for the reliability of the RI value. When a CSI process (the CSI process 2 in FIG. 19) is configured not to transmit an RI value, W1 may not be subsampled and may be fed back to achieve more accurate W1 information.

Like in the aforementioned examples, when only an RI value that is changed in a predetermined CSI process among a plurality of CSI processes is valid, if two or more number of times of feedback information transmission are expected at the same timing with respect to a plurality of periodic CSI process configuration, transmission priority needs to be effectively determined. Accordingly, a method of determining priority according to an embodiment of the present invention will be described below.

When one piece of feedback information to be transmitted is selected among a plurality of pieces of feedback information, it is generally effective to set an RI value with highest transmission priority, WB PMI/CQI with middle transmission priority, and subband PMI/CQI with lowest transmission priority. However, when an RI value that is changed in only one CSI process is valid as described above, it may be effective that RI transmission in other CSI processes in which a changed RI value is invalid has lower transmission priority than other information. Accordingly, according to an embodiment of the present invention, transmission priority may be determined according to a report type in an order of (1) RI report in which a changed RI value is valid, (2) WB PMI/CQI report, (3) subband PMI/CQI report, and (4) RI report in which a changed RI is invalid.

Figure 20:
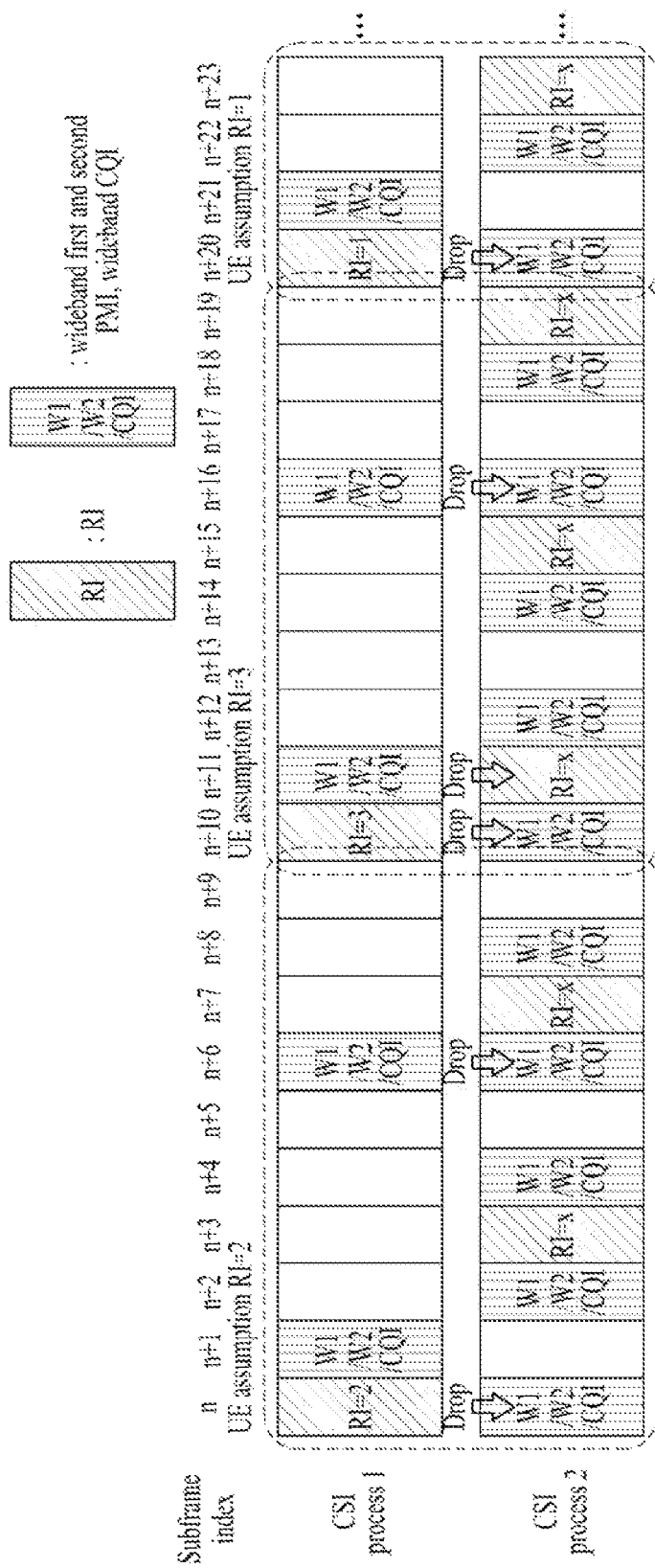
FIG. 20 is a diagram for explaining priority of feedback information transmission according to a report type and/or a CSI process index according to an embodiment of the present invention.

FIG. 20 is a diagram for explaining priority of feedback information transmission according to a report type and/or a CSI process index according to an embodiment of the present invention. Hereinafter, in FIG. 20, collision of CSI transmitted between CSI processes may include collision of CSI for the same serving cell.

In the example illustrated in FIG. 20, the CSI process 1 is configured in such a way that a changed RI value is valid in the CSI process 1 and the CSI process 2 is configured in such a way that a changed RI value is invalid in the CSI process 2. As in the example of FIG. 19, in the CSI process 2, no information may be transmitted at transmission timing of an RI value, the RI value determined in the CSI process 1 may be repeatedly fed back in order to increase the reliability of RI transmission, or a meaningless dummy value may be fed back. In subframes −n, (n+10), and (n+20), an RI value in the CSI process 1, in which a changed RI value is valid, has highest transmission priority, and thus, W1/W2/CQI information in the CSI process 2 is dropped.

At timing of a subframe −(n+6), the CSI process 1 and the CSI process 2 have feedback information with the same priority, transmission timings of which correspond to each other. That is, feedback information to be transmitted at the corresponding transmitting timing cannot be determined according to the aforementioned priority based on a report type. Accordingly, according to an embodiment of the present invention, priority is applied in phases in such a way that priority according to a report type is applied and then priority is determined according to a CSI process index when report types are the same.

That is, at timing of a subframe −(n+6) of the example shown in FIG. 20, information of the two CSI processes has priority according to the same report type and thus one transmission is dropped according to a predetermined rule (a CSI process index). Here, it is assumed that a lower CSI process index has higher priority. Accordingly, transmission of W1/W2/CQI feedback information transmitted via the CSI process 2 with a higher CSI process index may be dropped.

In a subframe −(n+11), the CSI process 2 is configured in such a way that a changed RI value is invalid and thus it is advantageous to set an RI value of the CSI process 2 to lower priority than RI/PMI/CQI of the CSI process 1. Accordingly, an RI value of the CSI process 2 is dropped.

Figure 21:
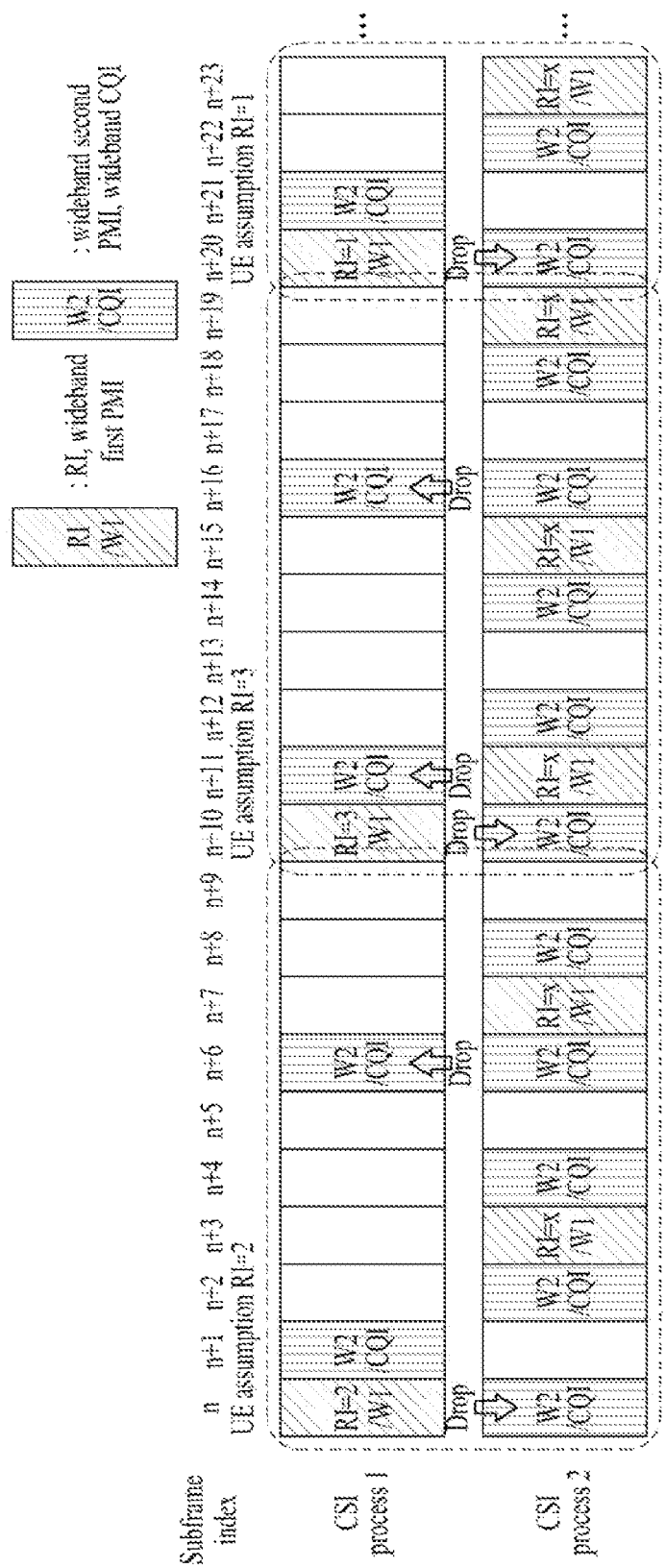
FIG. 21 is another diagram for explaining priority of feedback information transmission according to a report type and/or a CSI process index according to an embodiment of the present invention.

FIG. 21 is another diagram for explaining priority of feedback information transmission according to a report type and/or a CSI process index according to an embodiment of the present invention.

Similarly, in the example illustrated in FIG. 21, the CSI process 1 is configured in such a way that a changed RI value is valid in the CSI process 1 and the CSI process 2 is configured in such a way that a changed RI value is invalid in the CSI process 2. Unlike in the example of FIG. 20, in the embodiment of FIG. 21, it is assumed that an RI value is joint-encoded and transmitted with WI at feedback timing of the RI value. In the embodiment of FIG. 21, it is assumed that feedback information is transmitted via a CSI process with a high CSI process index when transmission timings of feedback information with the same priority according to a report type correspond to each other. In FIG. 21, with regard to collision of a subframe −(n+11), an RI value of the CSI process 2 in which a changed RI value is invalid has low priority but the joint encoded W1 has the same transmission priority as W2/CQI of the CSI process 1. Accordingly, in a subframe −(n+11), transmission of feedback information transmitted via the CSI process 1 and transmission of feedback information transmitted via the CSI process 2 have the same transmission priority. Accordingly, finally, W1 of the CSI process 2 has higher priority according to a predetermined rule and feedback transmission via a subframe −(n+11) of the CSI process 1 may be dropped.

In the examples illustrated in the aforementioned diagrams, for convenience of description, a plurality of CSI processes uses the same feedback mode. However, the present invention is not limited to the case in which the same feedback mode is configured and the same operating principle may also be applied to the case in which different feedback modes are applied to respective CSI processes.

According to another embodiment of the present invention, when transmission timings of feedback information correspond to each other between CSI processes, feedback information transmitted based on priority set for CSI processes is determined. For example, it may be assumed that transmission priority set for the CSI process 1 is set to be higher than the CSI process 2. In this case, when transmission timings of feedback information transmitted via the CSI processes 1 and 2 correspond to each other, a UE transmits feedback information via the CSI process 2 with higher priority and drops feedback information via the CSI process 1 with lower priority.

Furthermore, according to the present embodiment, priority set for a CSI process may be set according to a CoMP transmission scheme (CoMP-JP, DSP/DPB, or CoMP-CS/CB). As a precondition of the present embodiment, a plurality of CSI processes configured for the UE may calculate channel information for which different CoMP transmission schemes are assumed. That is, the UE may report different channel information according to a CoMP transmission scheme used by coordinated cells that participate in the scheme among CoMP transmission schemes (CoMP-JP, DSP/DPB, or CoMP-CS/CB).

FIG. 22 is a table showing various types of channel information (feedback contents) that a UE reports in a CoMP transmission situation in which two cells (TP1 and TP2) transmit data in cooperation with each other according to an embodiment of the present invention. In the example of the table of FIG. 22, "Desired signal hypothesis" indicates an assumed cell that receives a signal among the two cells that participate in a CoMP transmission scheme. In addition, "Interference signal hypothesis" refers to an assumed cell that causes interference among the two cells that participate in a CoMP transmission scheme. That is, according to an embodiment of the present invention, a CSI process may be defined by a combination of "Desired signal hypothesis" and "Interference signal hypothesis".

For example, the CSI process 1 is configured to calculate RI/PMI/CQI and to report the calculated channel information RI/PMI/CQI on the assumption that a UE receives a desired signal from the TP1 and receives an interference signal from the TP2. The CSI process 2 is configured to calculate RI/PMI/CQI and reports the channel information on the assumption that a UE which receives a desired signal from the TP1 and the TP2 does not transmit any interference signal. Comparing the channel information reported via the two processes, the channel information reported via the CSI process 2 may represent higher RI or CQI than the channel information reported via the CSI process 1 (because it is assumed that there is no interference signal in the CSI process 2). Similarly, CSI processes 3 and 4 are inversely configured to report acquired channel information on the assumption that a UE receives a desired signal from the TP2 and the TP1 transmits or does not transmit an interference signal. Lastly, a CSI process 5 is configured to report acquired channel information on the assumption that a UE receives a desired signal from both TP1 and TP2 and does not receive an interference signal from TP1 and TP2.

Like in the example illustrated the in FIG. 22, when CSI processes that assume various CoMP situations are used, a network can apply various CoMP transmission schemes based on channel information received via these CSI processes. Hereinafter, although it is assumed that the TP1 is a serving cell, it is obvious that the same principle can be applied to the case in which the TP2 operates as a serving cell. For example, when channel information via the CSI processes 1 and 2 is given from a UE, the network may determine an appropriate CoMP operation among CoMP-CS/CB and DPB and transmit a desired signal to the UE through the TP1. Similarly, when channel information via the CSI processes 3 and 4 is given from the UE, the network may determine an appropriate CoMP operation among CoMP-CS/CB and DPS/DPB and selectively transmit a desired signal from the TP1 or the TP2. When channel information via the CSI process 5 is given from the UE, the network may allow the TP1 and the TP2 to simultaneously transmit a desired signal using a CoMP-JP transmission scheme. When the network configures all available CSI processes for the UE, all CoMP transmission schemes of CoMP-CS/CB, DPS/DPB, CoMP-JP, etc. may be performed. In addition, as described above, when only some CSI processes are configured for the UE, a CoMP transmission scheme assumed in a CSI process among CoMP transmission schemes corresponding to the some CSI processes may be selected and performed.

As such, when different CoMP operations are assumed according to a CSI process configured for the UE and channel information is reported, it may be advantageous to determine priority in a network according to the importance of the assumed CoMP operation. That is, when transmission timings of feedback information correspond to each other between CSI processes, transmission priority may be configured to be higher for transmission of feedback information transmitted via the CSI process in which an important CoMP operation is assumed. In particular, the priority may be applied to periodic channel reporting using a PUCCH to facilitate a more effective CoMP operation. The priority may be semi-statically signaled to the UE together with CSI process configuration. As a detailed example, when transmission timings of feedback information via different CSI processes correspond to each other in a plurality of periodic PUCCH channel reports, the UE may report channel information of a CSI process with high priority and drop channel information of a CSI process with low priority.

With regard to configuration of priority for a CSI, when a frequency with which the UE receives a desired signal from a serving cell in the CoMP transmission situation is high, high priority may be set for a CSI process that assumes this situation. That is, in the example of the table shown in FIG. 22, the CSI processes 1 and 2 that assume this situation may have high priority. When another situation is assumed, when a frequency of CoMP-JT that is a method of simultaneously receiving a signal from two TPs is low, a CSI process of receiving a desired signal from one of the TP1 and the TP2 may have higher priority. In the example of the table of FIG. 22, the CSI processes 1, 2, 3, and 4 may correspond to this case.

FIG. 23 illustrates an example in which different priorities are configured for CSI processes and priority values are configured, according to an embodiment of the present invention. In the example of FIG. 23, the CSI processes 1 and 2 are configured with "Class A" that is highest priority and the CSI process 5 is configured with "Class C" that is lowest priority. According to an embodiment of the present invention, when "Priority value" is configured according to priority, a higher priority value is set for high priority. Via the aforementioned configuration of priority, even if various CSI processes are performed and transmission timings of a periodic PUCCH correspond to each other, the UE may stably transmit channel information to the network so as to support a CoMP operation of receiving a desired signal from at least a serving cell. In the aforementioned example, for convenience of description, priority is divided into three levels (high/middle/low). However, needless to say, it may be possible to set the priority to more levels (or fewer levels).

Furthermore, according to an embodiment of the present invention, other priority may be set according to a type of transmitted channel information (RI/PMI/CQI, etc.).

FIG. 24 is a diagram illustrating an example in which priority and a priority value are set according to a type of channel information transmitted via a CSI process according to an embodiment of the present invention. FIG. 24 exemplifies priority according to RI information, WB PMI/CQI, and subband PMI/CQI.

For example, RI information is reported only once with a long period but is very important in determining the accuracy of entire channel information. Thus, the RI information may be set to high priority. Then since WB PMI, WB CQI, or the like is reported with a long period compared with subband PMI or subband CQI and includes entire channel information, WB PMI, WB CQI, or the like may have high priority compared with subband information. In addition, according to the set priority, priority values may be set and a high priority value indicates higher priority.

FIG. 23 illustrates an embodiment in which priority is set according to a CoMP transmission scheme assumed by a CSI process. FIG. 24 illustrates an embodiment in which priority is set according to a type of channel information. Furthermore, an embodiment of the present invention proposes a method of simultaneously considering the two cases.

As an example of the method of simultaneously considering the two cases, a final priority value calculated via multiplication of priority values set in the examples of FIGS. 23 and 24 may be determined and the two priority values may be simultaneously considered via comparison of final priority values. That is, in the above example, RI information, WB PMI/CQI, and SB PMI/CQI in the CSI process 1 (priority value=3) may have 9, 6, and 3 as a final priority value. In addition, RI information, WB PMI/CQI, and SB PMI/CQI in the CSI process 5 (priority value=1) may have 3, 2, and 1 as final priority values. Accordingly, WB PMI (final priority value=6) transmitted via the CSI process 1 may have a higher priority value than RI information (final priority value=3) transmitted via the CSI process 5.

As another example of the method of simultaneously considering the two cases, priorities may be sequentially considered. For example, like in the example of the table of FIG. 23, priority may be applied for each CSI process and then priority according to channel information may be applied between CSI processes having the same priority like in the example of FIG. 24. On the other hand, priority according to channel information may be applied and then priority according to a CSI process may be further applied between channel information having the same priority.

Figure 25:
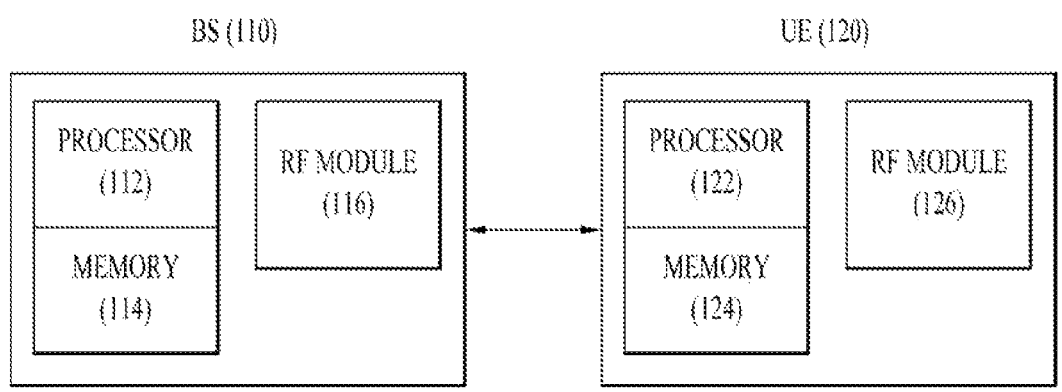
FIG. 25 illustrates a base station (BS) and a user equipment (UE) applicable to an embodiment of the present invention.

FIG. 25 illustrates a BS and a UE applicable to an embodiment of the present invention. In case of a wireless communication system including a relay, communication is performed between a BS and the relay in a backhaul link and between the relay and a UE in an access link. Accordingly, the BS or UE can be replaced by a relay as necessary.

Referring to FIG. 25, the wireless communication system includes a BS 110 and a UE 120. The BS 110 includes a processor 112, a memory 114, and a radio frequency (RF) unit 116. The processor 112 may be configured to embody the procedures and/or methods proposed according to the present invention. The memory 114 is connected to the processor 112 and stores various pieces of information associated with the processor 112. The RF unit 116 is connected to the processor 112 and transmits and/or receives a radio signal. The 120 includes a processor 122, a memory 124, and an RF unit 126. The processor 122 may be configured to embody the procedures and/or methods proposed according to the present invention. The memory 124 is connected to the processor 122 and stores various pieces of information associated with the processor 122. The RF unit 126 is connected to the processor 122 and transmits and/or receives a radio signal. The BS 110 and/or the UE 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS.

The term 'BS' may be replaced with the term, fixed station, Node B, 'eNode B (eNB), access point, etc.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory and executed by a processor. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method and apparatus for reporting channel state information (CSI) in a wireless communication system have been described in terms of a $3^{rd}$ generation partnership project long term evolution (3GPP LTE) system, the present invention is applicable to various wireless communication systems in addition to the 3GPP LTE system.

The invention claimed is:

1. A method for reporting channel state information (CSI) in a wireless communication system, the method comprising:
    transmitting first CSI according to a first CSI process of periodically reporting the first CSI every first period;
    transmitting second CSI according to a second CSI process of periodically reporting the second CSI every second period; and
    dropping transmission of one of the first CSI and second CSI based on a specific rule when transmission timing of the first CSI and transmission timing of the second CSI collide and the first CSI and the second CSI have a same transmission priority, and the first CSI process and second CSI process are CSI processes of a same serving cell, wherein the specific rule is defined as dropping a CSI except for a CSI corresponding to a CSI process with a lowest CSI process index from the first CSI and second CSI.

2. The method according to claim 1, wherein the first and second CSI are CSI for the same serving cell.

3. The method according to claim 1, wherein the first and second CSI comprises at least one of a channel quality indicator (CQI), a precoding matrix indicator (PMI), or a rank indicator (RI).

4. The method according to claim 1, wherein the first and second CSI are transmitted through a physical uplink control channel (PUCCH).

5. A user equipment (UE) in a wireless communication system, the UE comprising: a wireless communication module configured to transmit and receive a signal to and from base stations (BSs); and a processor connected to the wireless communication module and configured to control an operation of the UE, wherein the processor is configured to:

transmit first channel state information (CSI) according to a first CSI process with a first period;

transmit second CSI according to a second CSI process with a second period; and drop transmission of one of the first CSI and second CSI based on a specific rule when transmission of the first CSI and transmission of the second CSI collide and the first CSI and the second CSI have a same transmission priority, and the first CSI process and second CSI process are CSI processes of a same serving cell, wherein the specific rule is defined as dropping a CSI except for a CSI corresponding to a CSI process with a lowest CSI process index from the first CSI and second CSI.

6. The UE according to claim 5, wherein the first and second CSI are CSI for the same serving cell.

7. The UE according to claim 5, wherein the first and second CSI comprises at least one of a channel quality indicator (CQI), a precoding matrix indicator (PMI), or a rank indicator (RI).

8. The UE according to claim 5, wherein the first and second CSI are transmitted through a physical uplink control channel (PUCCH).

9. The UE according to claim 5, wherein each of the first and second CSI processes is a reporting operation of CSI using an independent reporting configuration, and defined by a combination of Desired signal hypothesis and interference signal hypothesis.

10. The UE according to claim 5, wherein the CSI process index indicates a CSI process to be used for specific CSI reporting, and the lowest CSI process index indicates that a rank indicator (RI) value can be changed in the corresponding CSI process.

* * * * *